(12) United States Patent
Carroll et al.

(10) Patent No.: US 10,637,744 B2
(45) Date of Patent: Apr. 28, 2020

(54) COMPLEMENTARY WORKFLOWS FOR IDENTIFYING ONE-HOP NETWORK BEHAVIOR AND MULTI-HOP NETWORK DEPENDENCIES

(71) Applicant: Battelle Memorial Institute, Richland, WA (US)

(72) Inventors: Thomas E. Carroll, Richland, WA (US); Satish Chikkagoudar, Richland, WA (US); Kristine M. Arthur-Durett, Richland, WA (US); Dennis G. Thomas, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 271 days.

(21) Appl. No.: 15/486,162

(22) Filed: Apr. 12, 2017

(65) Prior Publication Data
US 2018/0302306 A1 Oct. 18, 2018

(51) Int. Cl.
*H04L 12/24* (2006.01)
*H04L 12/26* (2006.01)

(52) U.S. Cl.
CPC .............. *H04L 41/16* (2013.01); *H04L 41/14* (2013.01); *H04L 43/026* (2013.01)

(58) Field of Classification Search
None
See application file for complete search history.

(56) References Cited

U.S. PATENT DOCUMENTS

| | | |
|---|---|---|
| 2013/0246606 A1 | 9/2013 | Branch et al. |
| 2016/0142266 A1 | 5/2016 | Carroll et al. |
| 2017/0126475 A1* | 5/2017 | Mahkonen .............. H04L 43/04 |

OTHER PUBLICATIONS

Box et al., *Time Series Analysis: Forecasting and Control*, 4th edition, Wiley, pp. vii-xx (2008).
Chikkagoudar et al., "AKAMA—CADDY: Cassandra Schema & Sample Queries," PNNL-SA-127580, 3 pp. (Apr. 2016).
(Continued)

*Primary Examiner* — Jeffrey R Swearingen
(74) *Attorney, Agent, or Firm* — Klarquist Sparkman, LLP

(57) ABSTRACT

A network analysis tool evaluates network flow information in complementary workflows to identify one-hop behavior of network assets and also identify multi-hop dependencies between network assets. In one workflow (e.g., using association rule learning), the network analysis tool can identify significant one-hop communication patterns to and/or from network assets, taken individually. Based on the identified one-hop behavior, the network analysis tool can discover patterns of similar communication among different network assets, which can inform decisions about deploying patch sets, mitigating damage, configuring a system, or detecting anomalous behavior. In a different workflow (e.g., using deep learning or cross-correlation analysis), the network analysis tool can identify significant multi-hop communication patterns that involve network assets in combination. Based on the identified multi-hop dependencies, the network analysis tool can discover functional relationships between network assets, which can inform decisions about configuring a system, managing critical network assets, or protecting critical network assets.

30 Claims, 14 Drawing Sheets

(56) References Cited

OTHER PUBLICATIONS

Harispe et al., "Semantic Similarity from Natural Language and Ontology Analysis," *Synthesis Lectures on Human Language Technologies*—preprint, 176 pp. (2015).
Ntoutsi et al., "Comparing Datasets Using Frequent Itemsets: Dependency on the Mining Parameters," *Proc. of the 5th Hellenic Conf. on Artificial Intelligence: Theories, Models and Applications*, pp. 212-225 (2008).
Pike et al., "The Scalable Reasoning System: Lightweight Visualization for Distributed Analytics," *Information Visualization*, vol. 8(1), pp. 71-84 (2009).
"Scalable Reasoning System," 2 pp., downloaded from the World Wide Web on Aug. 1, 2017.
Vaidya et al., "The Role Mining Problem: A Formal Perspective," *ACM Trans. on Information and System Security*, vol. 13, No. 3, pp. 27:1-27:31 (Jul. 2010).
Agrawal et al., "Fast Algorithms for Mining Association Rules," *Int'l Conf. on Very Large Data Bases*, vol. 1215, pp. 487-499 (1994).
Aguilera et al., "Performance Debugging for Distributed Systems of Black Boxes," *Proc. ACM Symp. on Operating System Principes*, vol. 37, Issue 5, pp. 74-89 (Dec. 2003).
Ahrenholz, "Comparison of CORE Network Emulation Platforms," *Proc. of Military Communications Conf.*, pp. 166-171 (2010).
Apache Cassandra, "What Is Cassandra," downloaded from the World Wide Web, 2 pp. (2016; downloaded on Apr. 12, 2017).
Bagchi et al., "Dependency Analysis in Distributed Systems Using Fault Injection: Application to Problem Determination in an e-Commerce Environment," *Proc. of the 12th Int'l Workshop on Distributed Systems: Operations and Management*, 14 pp. (Oct. 2001).
Bahl et al., "Discovering Dependencies for Network Management," *Proc. of the 5th Workshop on Hot Topics in Networks*, pp. 97-102 (Nov. 2006).
Bahl et al., "Towards Highly Reliable Enterprise Network Services via Inference of Multi-Level Dependencies," *Proc. ACM SIGCOMM Conf. on Data Communications*, pp. 13-24 (Aug. 2007).
Barham et al., "Constellation: Automated Discovery of Service and Host Dependencies in Networked Systems," Microsoft Tech. Rep. MSR-TR-2008-67, 14 pp. (Apr. 2008).
Barham et al., "Using Magpie for Request Extraction and Workload Modelling," *Proc. of the 6th Symp. on Operating Systems Design and Implementation*, pp. 259-272 (Dec. 2004).
Bartlett et al., "Understanding Passive and Active Service Discovery," *Proc. of the ACM Conf. on Internet Measurement*, pp. 57-70 (Oct. 2007).
Behnel et al., "Cython: The Best of Both Worlds," *Computing in Science & Engineering 13*, pp. 31-39 (Mar. 2011).
Black et al., "Ethernet Topology Discovery Without Network Assistance," *Proc. of the 12th IEEE Int'l Conf. on Network Protocols*, pp. 328-339 (Oct. 2004).
Borgelt, "An Implementation of FP-Growth Algorithm," *Proc. of the Workshop Open Source Data Mining Software*, 5 pp. (2005).
Borgelt, "FP-Growth—Frequent Item Set Mining," downloaded from the World Wide Web, 2 pp. (downloaded on Apr. 12, 2017).
Borgelt, "Frequent Item Set Mining," *Data Mining Knowledge Discovery 2*, pp. 437-456 (Nov. 2012).
Brown et al., "An Active Approach to Characterizing Dynamic Dependencies for Problem Determination in a Distributed Environment," *Proc. of the IEEE/IFIP Int'l Symp. on Integrated Network Management*, pp. 377-390 (May 2001).
Carroll et al., "Impact of Network Activity Levels on the Performance of Passive Network Service Dependency Discovery," *IEEE MILCOM*, pp. 1341-1347 (Oct. 2015).
Carroll et al., "Security Informatics Research Challenges for Mitigating Cyber Friendly Fire," *Security Informatics*, vol. 3, 14 pp. (Sep. 2014).
CERT NetSA Security Suite, Monitoring for Large-Scale Networks, "fixbuf," downloaded from the World Wide Web, 1 p. (downloaded on Apr. 12, 2017).
Chaudhary et al., "Flow Classification Using Clustering and Association Rule Mining," *IEEE Int'l Workshop on Computer Aided Modeling Analysis and Design of Communication Links and Networks*, pp. 76-80 (Dec. 2010).
Chen et al., "Automating Network Application Dependency Discovery: Experiences, Limitations, and New Solutions," *Proc. of the 8th USENIX Conf. on Operating Systems Design and Implementation*, pp. 117-130 (Dec. 2008).
Chen et al., "Path-Based Failure and Evolution Management," *Proc. of the 1st Symp. on Networked Systems Design and Implementation*, 14 pp. (Mar. 2004).
Claise, "Cisco Systems NetFlow Service Export Version 9," *IETF*, RFC 3954, 33 pp. (Oct. 2004).
Claise et al., "Information Model for IP Flow Information Export (IPFIX)," *IETF*, RFC 7012, 24 pp. (Sep. 2013).
Claise et al., "Specification of the IP Flow Information Export (IPFIX) Protocol for the Exchange of Flow Information," *IETF*, RFC 7011, 76 pp. (Sep. 2013).
D'Antonio et al., "Flow Selection Techniques," *IETF*, RFC 7014, 33 pp. (Sep. 2013).
Dechouniotis et al., "Dependency Detection Using a Fuzzy Engine," *Lecture Notes in Computer Science*, vol. 4785, pp. 110-121 (Oct. 2007).
Dechouniotis et al., "Dependency Detection Using a Fuzzy Inference Engine," *IEEE DSOM*, 12 pp. (2007).
Docker, Inc., "A Better Way to Build Apps," downloaded from the World Wide Web, 5 pp. (downloaded on Apr. 12, 2017).
Du et al., "Improved Peak Detection in Mass Spectrum by Incorporating Continuous Wavelet Transform-Based Pattern Matching," *Bioinformatics 22*, pp. 2059-2065 (Sep. 2006).
Dunagan et al., "FUSE: Lightweight Guaranteed Distributed Failure Notification," *Proc. of the 6th Symp. on Operating Systems Design and Implementation*, pp. 151-166 (Dec. 2004).
Fonseca et al., "X-Trace: A Pervasive Network Tracing Framework," *Proc. of the 4th USENIX Symp. on Networked Systems Design and Implementation*, pp. 271-284 (Apr. 2007).
Ganti et al., "A Framework for Measuring Changes in Data Characteristics," *Symp. on Principles of Database Systems*, pp. 126-137 (1999).
Hamming, *Numerical Methods for Scientists and Engineers*, 2nd Edition, Dover, 732 pp. (1986).
HoneProject, HoneProject homepage, downloaded from World Wide Web, 1 p., (accessed on Sep. 2, 2012).
IBM, "Tivoli Application Dependency Discovery Manager," downloaded from the World Wide Web, 8 pp. (downloaded on Apr. 12, 2017).
Inacio et al., "YAF: Yet Another Flowmeter," *Proc. of the 24th Large Installation System Administration Conf.*, 12 pp. (2010).
Joslyn et al., "Discrete Mathematical Approaches to Graph-Based Traffic Analysis," *Int'l Workshop on Engineering Cyber Security and Resilience*, 6 pp. (2014).
Kandula et al., "What's Going on? Learning Communication Rules in Edge Networks," *Proc. of the ACM Conf. on Data Communications*, pp. 87-98 (Aug. 2008).
Kar et al., "Managing Application Services over Service Provider Networks: Architecture and Dependency Analysis," *Proc. IEEE/IFIP Network Operations and Management Symp.*, pp. 61-74 (Apr. 2000).
Keller et al., "Classification and Computation of Dependencies for Distributed Management," *Proc. of the 5th IEEE Symp. on Computers and Communications*, pp. 78-83 (Jul. 2000).
Kertzner et al., "Process Control System Security Technical Risk Assessment Methodology & Technical Implementation," Institute for Information Infrastructure Protection, Research Report No. 13, 47 pp. (Mar. 2008).
Kiemele et al., Basic Statistics—Tools for Continuous Improvement, Fourth Edition, Chapter 12, "Case Studies," 131 pp. (Jun. 1997).
Li et al., "A Supervised Machine Learning Approach to Classify Host Roles on Line Using sFlow," *ACM Workshop on High Performance and Programmable Networking*, pp. 53-60 (Dec. 2013).
Li et al., "Association Based Similarity Testing and Its Applications," *Intelligent Data Analysis*, vol. 7, No. 3, pp. 209-232 (2003).

(56) References Cited

OTHER PUBLICATIONS

Lowekamp et al., "Topology Discovery for Large Ethernet Networks," *Proc. of Conf. on Applications, Technologies, Architectures, and Protocols for Computer Communications*, pp. 237-248 (Aug. 2001).
Marshall, "CANDID: Classifying Assets in Networks by Determining Importance and Dependencies," Ph.D. Dissertation, University of California, Berkeley, 93 pp. (May 2013).
Microsoft Corporation, "TCP Ports and Microsoft Exchange: In-Depth Discussion," downloaded from the World Wide Web, 9 pp. (Oct. 2006).
Natarajan et al., "NSDMiner: Automated Discovery of Network Service Dependencies," *Proc. of IEEE Int'l Conf. on Computer Communications*, pp. 2507-2515 (Mar. 2012).
North American Electric Reliability Corporation, "Security Guideline for the Electricity Sector: Identifying Critical Assets," 18 pp. (Sep. 2009).
Oler et al., "Graph Based Role Mining Techniques for Cyber Security," *Proc. of the FloCon*, 23 pp. (Jan. 2015).
OpenStrack, "What Is OpenStack?," downloaded from the World Wide Web, 5 pp. (downloaded on Apr. 12, 2017).
Pacific Northwest National Laboratory, "CyberNET Testbed," downloaded from the World Wide Web, 2 pp. (Nov. 2015).
Pacific Northwest National Laboratory, "DSOM: Decision Support for Operations & Maintenance," downloaded from World Wide Web, 21 pp. (document marked Apr. 2013).
Pacific Northwest National Laboratory, "Passive Cyber Asset Dependency Discovery (CADDY)," downloaded from the World Wide Web, 2 pp. (downloaded on Apr. 12, 2017).
Parthasarathy et al., "Clustering Distributed Homogeneous Datasets," *European Conf. on Principles of Data Mining and Knowledge Discovery*, pp. 566-574 (2000).
Peddycord et al., "On the Accurate Identification of Network Service Dependencies in Distributed Systems," *Large Installation System Administration Conf.*, pp. 181-194 (Dec. 2012).
Popa et al., "Macroscope: End-Point Approach to Networked Application Dependency Discovery," *Proc. of the 5$^{th}$ Int'l Conf. on Emerging Experiments and Technologies*, pp. 229-240 (Dec. 2009).
Proakis et al., *Digital Signal Processing—Principles, Algorithms, and Applications*, Chapter 4, "Frequency Analysis of Signals and Systems," and Chapter 11, "Linear Prediction and Optimum Linear Filters," pp. 230-393 and 852-895 (1996).
R Core Team, "R: a Language and Environment for Statistical Computing," downloaded from the World Wide Web, 2 pp. (downloaded on Apr. 12, 2017).
Rajahalme et al., "IPv6 Flow Label Specification," *IETF*, RFC 3697, 9 pp. (Mar. 2004).
Reynolds et al., "WAP5: Black-Box Performance Debugging for Wide-Area Systems," *Proc. of the 15$^{th}$ Int'l Conf. on World Wide Web*, pp. 347-356 (May 2006).
ServiceNow, "Discovery," downloaded from the World Wide Web, 2 pp. (downloaded on Apr. 12, 2017).
Solarwinds, "Network Management Software & Network Tools," downloaded from the World Wide Web, 5 pp. (downloaded on Apr. 12, 2017).
Trammell et al., "Bidirectional Flow Export Using IP Flow Information Export (IPFIX)," *IETF*, RFC 5103, 24 pp. (Jan. 2008).
Trammell et al., "Flow Aggregation for the IP Flow Information Export (IPFIX) Protocol," *IETF*, RFC 7015, 49 pp. (Sep. 2013).
Trammell et al., "Guidelines for Authors and Reviewers of IP Flow Information Export (IPFIX) Information Elements," *IETF*, RFC 7013, 32 pp. (Sep. 2013).
Van der Walt et al., "The NumPy Array: a Structure for Efficient Numerical Computation," *Computing in Science & Engineering*, pp. 22-30 (Feb. 2011).
Wikipedia, "Association Rule Learning," downloaded from the World Wide Web, 11 pp. (document marked Mar. 2017).
Zand et al., "Rippler: Delay Injection for Service Dependency Detection," *IEEE INFOCOM*, pp. 2157-2165 (Apr. 2014).

\* cited by examiner

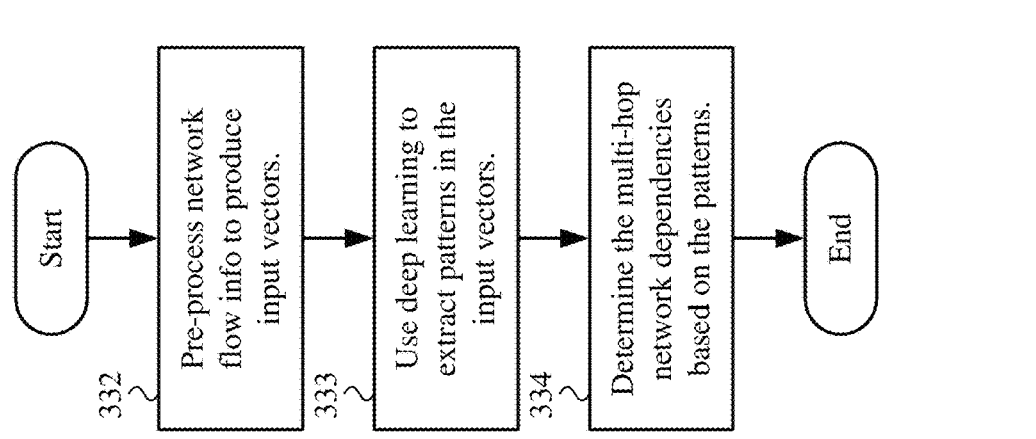
FIG. 3c (example of 330)
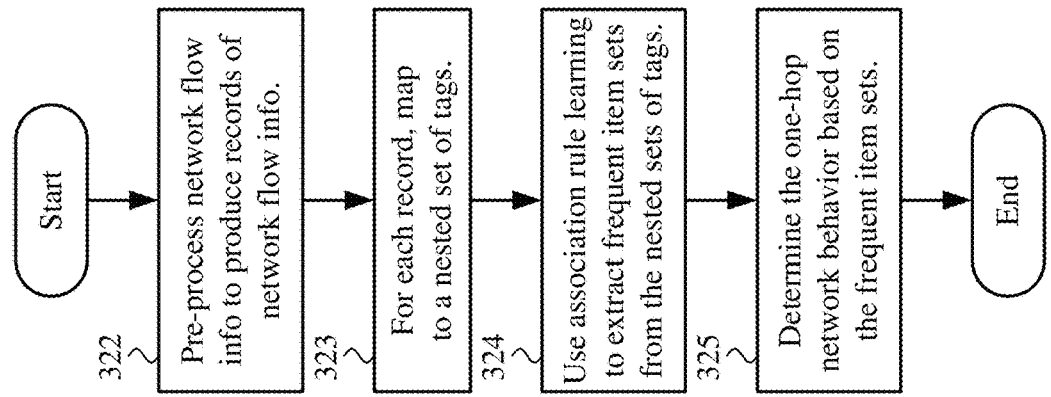
FIG. 3b (example of 320)
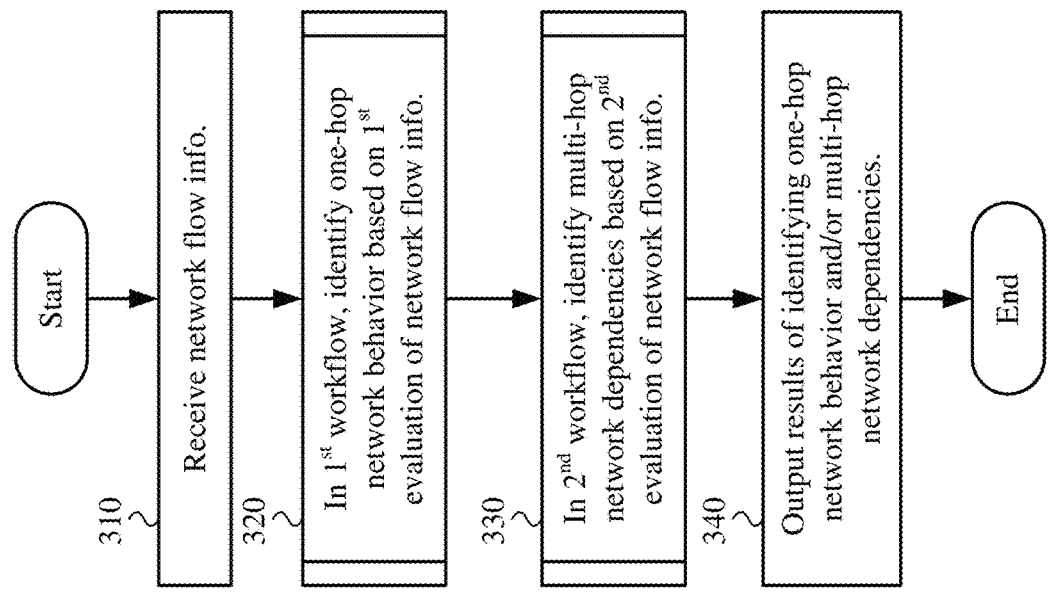
FIG. 3a

400

FIG. 5 example record 510 of network flow info:

| source address | source port | dest address | dest port | protocol |
|---|---|---|---|---|
| 10.12.10.137 | 49253 | 172.22.91.15 | 80 | TCP |

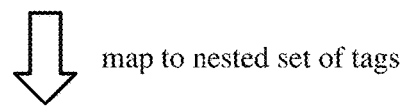
map to nested set of tags example nested set of tags 520:

| source address | source port | dest address | dest port | protocol |
|---|---|---|---|---|
| * | * | * | * | * |
| 10.12.00.00/16 | 49253 | 172.22.00.00/16 | HTTP/ | TCP |
| 10.12.10.00/8 |  | 172.22.91.15 | HTTP alternates |  |
| 10.12.10.137 |  |  | 80 |  |

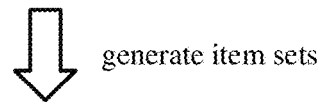
generate item sets example item sets 530:

| source address | source port | dest address | dest port | protocol |
|---|---|---|---|---|
| 10.12.00.00/16 | * | 172.22.00.00/16 | HTTP/ HTTP alternates | TCP |

| source address | source port | dest address | dest port | protocol |
|---|---|---|---|---|
| 10.12.00.00/16 | * | 172.22.91.15 | HTTP/ HTTP alternates | TCP |

| source address | source port | dest address | dest port | protocol |
|---|---|---|---|---|
| 10.12.10.137 | * | 172.22.91.15 | 80 | TCP |

// At time $t$, sample $N$ counts
$\quad T_A, T_{A'} \leftarrow Sample$
// Zero-pad timeseries
$\quad T_A \leftarrow \underbrace{(T_A[0], T_A[1], ..., T_A[N-1], 0, 0, ..., 0)}_{2N \text{ elements}}$ $\quad T_{A'} \leftarrow \underbrace{(T_{A'}[0], T_{A'}[1], ..., T_{A'}[N-1], 0, 0, ..., 0)}_{2N \text{ elements}}$ // Compute the forward FFT
$\quad F_A \leftarrow \text{FFT}(T_A)$
$\quad F_{A'} \leftarrow \text{FFT}(T_{A'})$
// Multiply, element-wise
$\quad F_{A,A'} \leftarrow F_A \cdot F_{A'}^*$
$\quad F_{A,A} \leftarrow F_A \cdot F_A^*$
$\quad F_{A',A'} \leftarrow F_{A'} \cdot F_{A'}^*$
// Smooth with Lanczos $\sigma$ factor
$\quad F_{A,A'} \leftarrow F_{A,A'} \cdot \sigma$
$\quad F_{A,A} \leftarrow F_{A,A} \cdot \sigma$
$\quad F_{A',A'} \leftarrow F_{A',A'} \cdot \sigma$
// Compute the inverse FFT
$\quad Cov_{A,A'} \leftarrow \text{IFFT}(F_{A,A'})$
$\quad Cov_{A,A} \leftarrow \text{IFFT}(F_{A,A})$
$\quad Cov_{A',A'} \leftarrow \text{IFFT}(F_{A',A'})$
$\quad C_{A,A'} \leftarrow Cov_{A,A'} / \sqrt{Cov_{A,A}[0]} / \sqrt{Cov_{A',A'}[0]}$
$\quad \text{PeakDetect}(C_{A,A'})$

COMPLEMENTARY WORKFLOWS FOR IDENTIFYING ONE-HOP NETWORK BEHAVIOR AND MULTI-HOP NETWORK DEPENDENCIES

STATEMENT AS TO RIGHTS TO INVENTIONS MADE UNDER FEDERALLY-SPONSORED RESEARCH AND DEVELOPMENT

This invention was made with government support under Contract DE-AC0576RL01830 awarded by the U.S. Department of Energy. The government has certain rights in the invention.

BACKGROUND

Large enterprises typically support complex, dynamic computer networks. A network node in a computer network can originate, route, or receive data. A service, application or other software (generally, a service) running on a network node may depend on functionality provided by another service running at another network node. The other service may, in turn, depend on functionality provided by a third service running at a third network node, fourth service running at a fourth node, and so on.

Knowledge of the behavior of network assets (e.g., network nodes, services) in a computer network can be difficult to acquire. Documentation is often defective or incomplete, as the process of generating and maintaining documentation can be labor-intensive and time-intensive. Furthermore, the roles and purposes of network assets may change in response to evolving business objectives and requirements. To develop an accurate understanding of the behavior of a computer network, the network behavior can be characterized in terms of relationships and communications. Such characterizations of network behavior can then be employed in support of such diverse tasks as fault diagnosis and localization, network architecture and management, and cybersecurity operations.

Similarly, knowledge of dependencies between network assets in a computer network can be important when assessing damage to the network, planning extensions to the network, planning how to recover from a disaster, or otherwise evaluating the current or planned behavior of the network. Knowledge of network dependencies can also help assess criticality, which is a measure of the business importance of a network asset. Information technology personnel are often unaware of dependencies between network assets, however, especially in a large network. Further complicating their jobs, in many cases, a computer network dynamically changes as network assets are added to the network or removed from the network. The dynamic nature of computer networks is illustrated, for example, in cloud computing networks that scale to meet demands with "limitless" resources, in networks of consumer devices (e.g., the so-called Internet of Things), and in enterprise networks in which employees can add their own devices (e.g., according to so-called Bring Your Own Device or Bring Your Own Technology policies). In such computer networks, a large number of network assets may be characterized by spatial transiency, temporal transiency and ephemeral lifetimes.

SUMMARY

In summary, the detailed description presents innovations in the area of network analysis. For example, a network analysis tool uses complementary workflows to identify one-hop network behavior of network assets and identify multi-hop network dependencies between network assets. Based on the identified one-hop network behavior, the network analysis tool can discover patterns of similar communication among different network assets, which can in turn inform decisions about deploying patch sets, mitigating damage, configuring a system, or detecting anomalous behavior. Based on the identified multi-hop network dependencies, the network analysis tool can discover functional relationships between network assets, which can inform decisions about configuring a system, managing critical network assets, or protecting critical network assets.

According to one aspect of the innovations described herein, a network analysis tool receives network flow information. For example, the network flow information includes an n-tuple per network flow, where the network flow is an aggregation of packets that have common protocol attributes. The network flow information can be received from multiple network probes situated in a network, or from another source.

In a first workflow, the network analysis tool identifies one-hop network behavior of at least some of a set of network assets based on a first evaluation of the network flow information. In general, the one-hop network behavior for a given network asset summarizes outgoing communications from the given network asset and/or incoming communications to the given network asset. The first workflow can be a machine learning workflow that includes multiple stages, for example, a pre-processing stage, a mapping stage, an extraction stage, and a summary stage. Alternatively, the first workflow can include other and/or additional stages.

As part of the pre-processing stage of the first workflow, the network analysis tool can pre-process the network flow information to produce records of network flow information. The pre-processing stage can include: (a) selectively converting unidirectional flow information, in the network flow information, to bidirectional flow information; (b) windowing the network flow information using a time interval; (c) annotating the records with details about the network flow information; and/or (d) other operations.

As part of the mapping stage of the first workflow, for each of the records, the network analysis tool can map the record to a nested set of tags. For example, for a given record, the network analysis tool applies a function to attributes of the given record to determine the nested set of tags for the given record. The attributes can include source address, source port, destination address, destination port, protocol, and/or another attribute. An address can be a network address (e.g., IPv4 address, IPv6 address) or logical address (e.g., name). For a given attribute, the function can consider the value of the given attribute, or the function can ignore the given attribute or apply a wildcard to permit any value for the given attribute. In general, for a given attribute, the function produces a hierarchy of tags that characterize the given attribute.

As part of the extraction stage of the first workflow, the network analysis tool can use association rule learning to extract frequent item sets from the nested sets of tags for the records. In general, the association rule learning is machine learning that identifies frequently-occurring sets of tags. As part of the association rule learning, for a given item set in the nested sets of tags for the records, the network analysis tool can determine support of the given item set, and compare the support of the given item set to a threshold (e.g., a user-specified threshold). Alternatively, the network analysis tool computes other and/or additional measures for the association rule learning.

As part of the summary stage of the first machine learning workflow, the network analysis tool can determine the one-hop network behavior based on the frequent item sets. For example, the network analysis tool identifies subsets of network assets that have similar network behavior based on a measure of similarity or dissimilarity between pairs of the frequent item sets.

In parallel with the first workflow, the network analysis tool can use a second workflow (different than the first workflow) to identify multi-hop network dependencies. In the second workflow, the network analysis tool identifies network dependencies between at least some of the set of network assets based on a second evaluation of the network flow information. The second workflow can be a machine learning workflow that includes multiple stages, for example, a pre-processing stage, an extraction stage, and a summary stage. In the pre-processing stage of the second workflow, the network analysis tool can pre-process the network flow information to produce input vectors. In the extraction stage of the second workflow, the network analysis tool can use deep learning to extract patterns in the input vectors. In general, the deep learning is machine learning that models high-level abstractions in the input vectors. In the summary stage of the second workflow, the network analysis tool can determine the multi-hop network dependencies based on the patterns. Alternatively, the second workflow can include other and/or additional stages.

In one alternative implementation for the second workflow, the network analysis tool uses cross-correlation analysis to identify multi-hop network dependencies. Again, the second workflow includes multiple stages. In a pre-processing stage, the network analysis tool can pre-process network flow information to produce time series of information for flow aggregates. For example, the pre-processing includes aggregating the network flow information into flow aggregates, windowing the network flow information using a time interval, and encoding the windowed flow aggregates as time series. In a cross-correlation stage, the network analysis tool calculates cross-correlation coefficients between time series. To do so, the network analysis tool can use convolution operations, e.g., with forward and inverse frequency transform operations. The network analysis tool can apply smoothing operations to the cross-correlation coefficients, e.g., with Lanczos smoothing factors. In a peak detection stage, the network analysis tool can determine multi-hop network dependencies based on the cross-correlation coefficients. For example, the network analysis tool determines whether a peak exists in the cross-correlation coefficients by checking whether a maximum value of correlation coefficients is above a threshold or by detecting a peak shape using a continuous wavelet transform.

After completing the respective workflows, the network analysis tool outputs results of the identifying the one-hop network behavior and/or results of the identifying the multi-hop network dependencies. For example, the network analysis tool renders a heat map of dissimilarity scores for network assets, which illustrates which of the network assets have similar one-hop network behavior.

The network analysis tool can repeat the operations of receiving network flow information, identifying one-hop network behavior, identifying multi-hop network dependencies, and outputting results on a periodic basis (e.g., every 30 seconds, every minute, every 10 minutes). In this way, the network analysis tool can update an assessment of the one-hop network behavior and the multi-hop network dependencies on a near real-time basis.

The innovations can be implemented as part of a method, as part of a computing system adapted to perform the method or as part of tangible computer-readable media storing computer-executable instructions for causing a computing system to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 3a-3c are flowcharts illustrating a generalized technique for identification of one-hop network behavior and multi-hop network dependencies between network assets using complementary workflows.

FIG. 5 is a diagram of a simplified record of network flow information, an example nested set of tags, and example item sets for input to association rule learning.

FIG. 16 is a pseudocode listing that illustrates features of cross-correlation analysis between time series for flow aggregates.

DETAILED DESCRIPTION

Figure 1:
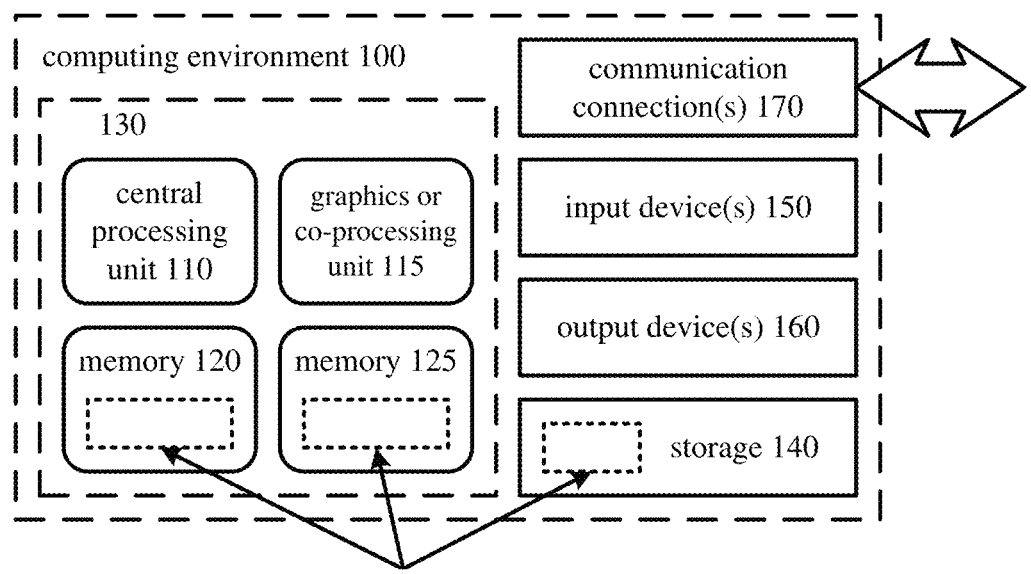
FIG. 1 is a diagram of an example computer system in which some described embodiments can be implemented.

In a computer network, a service, application or other software (generally, a service) runs on a network node. A given service frequently depends on other services in the computer network. When one of the other services fails, the given service may be unable to perform its function. Information about the dependencies between network assets (e.g., network nodes, services) in a computer network can help a decision-maker during business planning, disaster recovery, crisis management or triage, or other scenarios. Further, a computer network can be a complex, dynamic computing environment that responds to evolving business objectives and requirements. Accurately characterizing the current behavior of network assets in such an environment is important for network management and cybersecurity scenarios.

The detailed description presents innovations in the area of network analysis. For example, a network analysis tool uses complementary workflows to identify the one-hop behavior of network assets and identify multi-hop dependencies between network assets. One workflow (e.g., using association rule learning) can be used to discover significant one-hop communication patterns to and/or from network assets, taken individually, while a different workflow (e.g., using deep learning) can be used to discover significant multi-hop communication patterns that involve network assets in combination.

In particular, to identify the one-hop behavior of network assets, taken individually, the network analysis tool can map records of network flow information to nested sets of tags that contextualize the data in terms of network principals and enterprise concepts. The network analysis tool can extract frequent combinations, which characterize one-hop behaviors, from the nested sets of tags for the flow records. The one-hop behaviors of different network assets can then be compared, so as to identify network assets that express similar one-hop network behaviors.

In some example implementations, the network analysis tool receives network flow information and uses association rule learning—machine learning that identifies frequently-occurring sets of tags—to identify significant one-hop network behaviors of network assets. The significant one-hop network behaviors can be behaviors that exceed a threshold (e.g., user-specified threshold) for frequency. Based on the identified one-hop network behavior, the network analysis tool can discover patterns of similar communication among different network assets, which can in turn inform decisions about deploying patch sets, mitigating damage or risks, configuring a system, or detecting anomalous patterns that may indicate compromise of the computer network or network assets.

In some example implementations, the network analysis tool receives network flow information and uses deep learning—machine learning that models high-level abstractions in the network flow information—to identify multi-hop network dependencies between network assets. The identified multi-hop network dependencies can be recurrent temporal sequence-based patterns, which are randomly-initiated, repeating sequences of time-dependent elements. Based on the identified multi-hop network dependencies, the network analysis tool can discover functional relationships between network assets, which can inform decisions about configuring a system, managing critical network assets, or protecting critical network assets. Alternatively, the network analysis tool can discover multi-hop network dependencies in some other way, e.g., aggregating flows, calculating cross-correlation coefficients from time series of flow aggregates, and detecting peaks in the cross-correlation coefficients.

With information discovered using the complementary workflows, a network analysis tool can summarize network behavior in intuitive terms that are meaningful to network and cybersecurity practitioners. Furthermore, the workflows are lightweight and require minimal pre-processing, which support operations on large volumes of data.

In the examples described herein, identical reference numbers in different figures indicate an identical component or module. Depending on context, a given component or module may accept a different type of information as input and/or produce a different type of information as output. More generally, various alternatives to the examples described herein are possible. For example, some of the methods described herein can be altered by changing the ordering of the method acts described, by splitting, repeating, or omitting certain method acts. The various aspects of the disclosed technology can be used in combination or separately. For example, the association rule learning workflow to identify one-hop network behavior can be used by itself or in combination with a workflow to identify multi-hop network dependencies. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a computing system (100) in which several of the described innovations may be implemented. The computing system (100) is not intended to suggest any limitation as to scope of use or functionality, as the innovations may be implemented in diverse computing systems, including special-purpose computing systems adapted for network analysis using one or more workflows (e.g., an association rule learning workflow and/or other workflow).

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for using complementary workflows to identify one-hop network behavior and multi-hop network dependencies, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for using complementary workflows to identify one-hop network behavior and multi-hop network dependencies.

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein. The disclosed methods can be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms denote operations performed by a computer, and should not be confused with acts performed by a human being. The actual computer operations corresponding to these terms vary depending on implementation.

II. Identifying Network Behavior and Dependencies Using Complementary Workflows.

This section describes features of a network analysis tool that uses complementary workflows to identify the one-hop behavior of network assets in a computer network and identify multi-hop dependencies between network assets in the computer network. One workflow (e.g., using association rule learning) can be used to discover significant one-hop communication patterns to and/or from network assets, taken individually. A one-hop interaction can be, for example, communications of an application depending on a simple service that does not require any external resources. A different workflow (e.g., using deep learning) can be used to discover significant multi-hop communication patterns that involve network assets in combination. A multi-hop interaction can be, for example, a local service communicating with another, network service that in turn depends on another, external service.

A. Computer Networks and Network Flow Information.

A computer network is a set of computer devices that exchange data along connections, which can be wired or wireless. A network node in a computer network can originate, route, or receive data. A service, application or other software (generally, a service) running on a network node rarely functions in isolation. More often, a service depends on functionality provided by one or more other service running at other network nodes.

In a packet-switched computer network, data is transferred within the computer network in the form of packets. In addition to a data payload, a packet typically includes address information for a source (or originator) of the packet, address information for a destination (or recipient) of the packet, and protocol information. The Internet and other networks that use Internet protocol ("IP") addressing are examples of packet-switched networks.

In general, a network flow is an aggregation of packets that share common protocol attributes. For example, when a Web browser opens a connection to a Web server using transmission control protocol ("TCP"), there are at least two flows: one flow for the request from Web browser to the Web server, and another flow for the return of the response from the Web server to the Web browser. More formally, a network flow (also called a traffic flow, or simply a flow) is a sequence of packets sent from a particular source to a particular destination that the source desires to label as a flow. The destination can be a unicast, anycast or multicast destination. A network flow may include all packets in a specific transform connection or media stream, but does not necessarily have a one-to-one mapping to a transform connection or media stream.

Network flow information provides a description of a network flow, but does not provide the actual packets of the network flow. As metadata about packets, the network flow information is efficient to capture and record (compared to capturing and caching packets, which involves processing much more data), and it provides a measure of privacy to users of the computer network. For example, network flow information provides a high-level summary of the network flow as an n-tuple. The attributes of the n-tuple depend on implementation. In some formats, a network flow is represented as a 9-tuple:

($time_{start}$, $time_{end}$, $addr_{src}$, $addr_{dst}$, $ID_{protocol}$, $port_{src}$, $port_{dst}$, $num_{pkts}$, $num_{octets}$), in which the $time_{start}$ and $time_{end}$ attributes represent the start time and end time, respectively, for the network flow. The $addr_{src}$, $port_{src}$, $addr_{dst}$, and $port_{dst}$ attributes represent the source address, source port, destination address, and destination port, respectively, for the network flow. For example, the addresses are IP addresses, and the ports are TCP ports or user datagram protocol ("UDP") ports. Alternatively, instead of source port and destination port, some other transport-level attributes can be used to identify the source and destination. (The src and dst labels identify endpoints in terms of the computer communications. They do not indicate any roles in terms of a client-server relationship.) The $ID_{protocol}$ attribute identifies the protocol (e.g., TCP, UDP) used for the network flow. Finally, the $num_{pkts}$ and $num_{octets}$ attributes indicate size or volume of a network flow in terms of a count of packets ($num_{pkts}$) or count of bytes ($num_{octets}$). Alternatively, an n-tuple for a network flow includes other and/or additional attributes. For example, network flow information for a network flow can include start time and duration attributes, rather than start time and end time attributes. In any case, packets with the same address signature (same values for addressing attributes and protocol ID) can be included in the same network flow.

Examples of formats for network flow information include versions of NetFlow and IP Flow Information Export ("IPFIX"). A format for network flow information may include various format-specific fields. For example, NetFlow v5 defines thirteen fields per tuple, while the IPFIX format is extensible and defines over one hundred information fields.

Network flow information is typically unidirectional, representing packets flowing from a source to a destination as endpoints in a computer network. Network flow information can, however, be bidirectional flow (or "biflow") information that represents packets flowing in both directions between the endpoints. In this case, the src and dst labels can be replaced with labels such as first and second, or A and B, with labels assigned depending on the timing of initiation and response of the communication. For a bidirectional flow, network flow information can include separate statistics (such as $num_{pkts}$ and $num_{octets}$) for each direction.

Network flow information can be provided by network probes in a computer network. A typical network probe (also called a generator) combines the functionality of a packet meter and exporter. The packet meter generates flow information records from an observation point through which network traffic passes. The exporter receives records generated by the packet meter, aggregates the records into messages, and transmits the messages across the computer network to a collector. The collector receives messages from the various network probes, extracts the network flow information, and provides the network flow information to a network analysis tool. Network probes that produce network flow information in NetFlow and IPFIX formats can be deployed throughout a network. For example, NetFlow v5 can be used to meter packets in multiple vendors' products such as network routers and switches.

In operation, a collector can receive messages including network flow information from different network probes on an ad hoc basis. According to a push architecture, network probes can report network flow information periodically (e.g., every 5 minutes, every 15 minutes) or on some other basis. Or, according to a pull architecture, a collector can request new network flow information from network probes periodically or on some other basis. The more frequently network flow information for a computer network is updated, the closer the network analysis tool can get to providing a real-time assessment of dependencies in a computer network.

To support analytics, network flow information can be represented in a traffic graph (e.g., a directed, attributed multigraph). A vertex in the traffic graph represents a network asset (e.g., node, service), and an edge represents communication between two vertices. Edge attributes can provide details about communications.

B. Example Software Architecture with Complementary Workflows.

Figure 2:
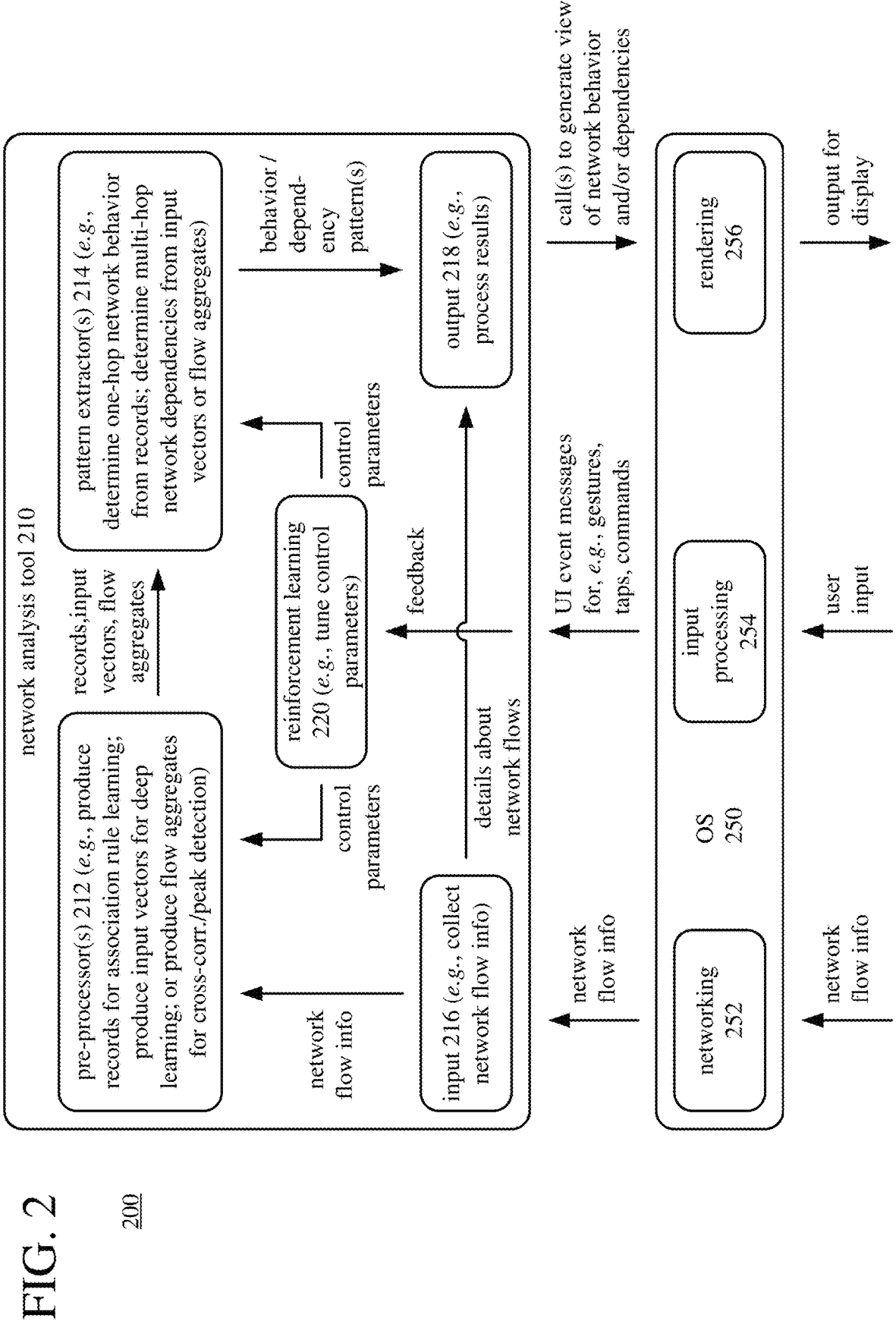
FIG. 2 is a block diagram illustrating an example software architecture in which a network analysis tool is configured to use complementary workflows to identify one-hop network behavior and multi-hop network dependencies.

FIG. 2 shows an example software architecture (200) in which a network analysis tool (210) is configured to use complementary workflows to identify one-hop network behavior and multi-hop network dependencies. The network analysis tool (210) works with an operating system ("OS") (250). A computer system (e.g., smartphone, tablet computer, personal computer, or other computing system) can execute software organized according to the architecture (200).

The architecture (200) includes an OS (250) and a network analysis tool (210) that use services of the OS (250). In FIG. 3, the OS (250) includes components for rendering (e.g., rendering visual output to a display), components for networking, and components for input processing. Other components of the OS (250) are not shown. In general, the OS (250) manages user input functions, output functions, storage access functions, network communication functions, and other functions for the computing system. The OS (250) provides access to such functions to the network analysis tool (210) and other software running on the computing system.

In a networking module (252), the OS (250) receives network flow information from one or more network probes of a computer network. The networking module (250) acts as a collector of messages that include the network flow information. The networking module (252) can provide the network flow information to the input module (216) of the network analysis tool (210) by passing the messages. Or, the networking module (252) can extract the network flow information from the messages and provide the network flow information directly to the input module (216) of the network analysis tool (210). The networking module (252) can send requests to network probes and/or send replies to network probes, regarding the messages that include the network flow information.

A user generates user input, which can be tactile input such as touchscreen input, mouse input, button presses or key presses, or can be voice input. In an input processing module (254), the OS (250) includes functionality for recognizing taps, finger gestures, or other input to a touchscreen, recognizing commands from voice input, mouse input, button input or key press input, and creating messages that can be used by the network analysis tool (210). The network analysis tool (210) listens for UI event messages from the OS (250). The UI event messages can indicate a gesture or tap on a touchscreen, mouse input, key press input, or another UI event (e.g., from voice input, directional buttons, trackball input). If appropriate, the network analysis tool (210) can react to the user input (or another type of notification) by making one or more calls to the OS (250) or performing other processing. In particular, based on user input, a reinforcement learning module (220) of the network analysis tool (210) can tune control parameters for preprocessing and/or pattern extraction.

The network analysis tool (210) includes a pre-processor (212), a pattern extractor (214), an input module (216), an output module (218), and a reinforcement learning module (220). Overall, the network analysis tool (210) receives network flow information, identifies one-hop network behavior and multi-hop network dependencies between network assets of a computer network using complementary workflows, and outputs results of the identification of the one-hop network behavior and/or multi-hop network dependencies.

The input module (216) receives network flow information (e.g., as part of messages, as records of network flow information) from the networking module (252) of the OS (250). The input module (216) collects the network flow information and provides it to the pre-processor (212).

The pre-processor (212) receives the network flow information from the input module (216). For an association rule learning workflow used to discover one-hop network behavior, the pre-processor (212) processes the network flow information to produce records of the network flow information (also called flow records). Section III describes examples of stages of pre-processing for the association rule learning workflow. For a deep learning workflow used to discover multi-hop network dependencies, the pre-processor (212) processes the network flow information to produce input vectors. Section IV describes examples of stages of pre-processing for the deep learning workflow. Alternatively, for a cross-correlation/peak detection workflow used to discover multi-hop network dependencies, the pre-processor (212) processes the network flow information to produce flow aggregates. Section V describes examples of stages of pre-processing for the cross-correlation/peak detection workflow. Alternatively, the pre-processor (212) performs other and/or additional stages of pre-processing. One or more control parameters can control stages of processing in the pre-processor (212). The pre-processor (212) provides the flow records, input vectors, flow aggregates, etc. to the pattern extractor (214).

The pattern extractor (214) can use the association rule learning workflow to extract patterns indicative of one-hop network behavior in flow records provided by the pre-processor (212). The association rule learning is a set of coordinated machine learning approaches that identify frequently-occurring sets of tags in the flow records. Section III describes examples of operations in the association rule learning workflow. Or, the pattern extractor (214) can use the deep learning workflow to extract patterns indicative of multi-hop network dependencies in input vectors provided by the pre-processor (212). The deep learning is a set of coordinated machine learning approaches that model high-level abstractions in the input vectors. Section IV describes examples of operations in the deep learning workflow. Alternatively, the pattern extractor (214) can use the cross-correlation/peak detection workflow to extract patterns indicative of multi-hop network dependencies in flow aggregates provided by the pre-processor (212). Section IV describes examples of operations in the cross-correlation/peak detection workflow. One or more control parameters can control stages of processing in the pattern extractor (214). Alternatively, the pattern extractor (214) performs other and/or additional stages of pattern extraction using an association rule learning workflow, deep learning workflow, cross-correlation/peak detection workflow, or different workflow. The pattern extractor (214) provides one or more one-hop network behavior patterns and multi-hop network dependency patterns to the output module (218).

The output module (218) receives the behavior and dependency pattern(s) from the pattern extractor (214). The output module (218) can also receive details about the network flows in the network flow information. Such details can be added to the flow records, input vectors, or flow aggregates (as labels or other annotations) by the pre-processor (212). Or, such details can be passed directly by the input module (216). In any case, the output module (218) processes the behavior and dependency pattern(s) (and other details about the network flows) to make one or more calls to the OS (250) to generate a view of the one-hop behavior of the network assets of the computer network and/or a view of the multi-hop dependencies between the network assets.

In a rendering module (256), the OS (250) handles the call(s) from the output module (218) of the network analysis tool (210) to generate a view of the one-hop behavior of the network assets and/or a view of the multi-hop dependencies between the network assets. Section III describes examples of views of one-hop network behavior, and section IV describes examples of views of multi-hop network dependencies.

The reinforcement learning module (220) sets control parameters for the pre-processor (212) and/or the pattern extractor (214), and can hence provide feedback within the network analysis tool (210). The feedback can influence the pipeline of processing within the network analysis tool (210), thereby improving accuracy of the network analysis. Initially, the control parameters can have default values or values from a prior session of network analysis. The reinforcement learning module (220) can then tune the control parameters based on user input, e.g., reacting to a view rendered by the rendering module (256). For example, through input to a graphical user interface, an analyst (user) can select network assets, combinations of network assets, or dependencies that should be ignored in subsequent analysis because such network assets, combinations, dependencies, etc. represent "false positives" in the output. Or, as another example, through input to a graphical user interface, the analyst (user) can select network assets, combinations of network assets, or dependencies that should get extra attention, weight or detail in subsequent analysis because such network assets, combinations, dependencies, etc. are of particular interest to the analyst, or are confirmed to be part of meaningful results. The reinforcement learning module (220) can also tune control parameters based on feedback from within the network analysis tool (210), e.g., based on thresholds defined so as to remove from consideration events that are insignificant or are outliers. The control parameters used within the network analysis tool (210) depend on implementation. Section III describes examples of control parameters for the association rule learning workflow, Section IV describes examples of control parameters for the deep learning workflow, and Section V describes examples of control parameters for the cross-correlation/peak detection workflow. Alternatively, the control parameters include other and/or additional control parameters.

Alternatively, the OS (250) includes more or fewer modules. Or, the network analysis tool (210) includes more or fewer modules. A given module can be split into multiple modules, or different modules can be combined into a single module.

C. Example Uses of Complementary Workflows.

FIG. 3a illustrates a generalized technique (300) for identification of one-hop network behavior and multi-hop network dependencies between network assets using complementary workflows. FIG. 3b illustrates an example technique (321) for identification of one-hop behavior of network assets using association rule learning, which can be performed as part of the generalized technique (300) or separately. FIG. 3c illustrates an example technique (331) for identification of multi-hop dependencies between network assets using deep learning, which can be performed as part of the generalized technique (300) or separately. The techniques (300, 321, 331) can be performed by a network analysis tool as described with reference to FIG. 2 or by another network analysis tool.

To start, the network analysis tool receives (310) network flow information. For example, the network flow information includes an n-tuple per network flow, where a network flow is an aggregation of packets that have common protocol attributes (such as the same source address, same source port or other transport-level attribute for the source, same destination address, and same destination port or other transport-level attribute for the destination). The network flow information can be received from network probes situated in a network (e.g., in routers in the network) or received from one or more other providers as part of a push architecture or pull architecture for delivering network flow information. The format of the network flow information can be a NetFlow format, IPFIX format or other format.

In a first workflow, the network analysis tool identifies (320) one-hop network behavior of at least some of a set of network assets based on a first evaluation of the network flow information. In general, the one-hop network behavior for a given network asset summarizes outgoing communications from the given network asset and/or incoming communications to the given network asset. For example, the network analysis tool identifies (320) one-hop network behavior of one or more network assets using the approach shown in FIG. 3b, which uses association rule learning, or another workflow. FIG. 3b illustrates example stages (321) of processing performed when identifying one-hop network behavior of network assets with an association rule learning workflow.

With reference to FIG. 3b, when evaluating network flow information as part of the first workflow, the network analysis tool can pre-process (322) the network flow information to produce records of network flow information. Examples of pre-processing stages in the association rule learning workflow are described below with reference to FIG. 6. The pre-processing (322) can include various stages. For example, the pre-processing (322) includes one or more of: (a) selectively converting unidirectional flow information, in the network flow information, to bidirectional flow information; (b) windowing the network flow information using a time interval; and/or (c) annotating the records with details about the network flow information. Alternatively, the pre-processing (322) includes other and/or additional stages.

For each of the records, the network analysis tool maps (323) the record to a nested set of tags. For a given record of the records, the network analysis tool can apply a function to attributes of the given record to determine the nested set of tags for the given record. The attributes can include source address (network address or logical address/name), source port, destination address (network address or logical address/name), destination port and protocol. Or, the attributes can include other and/or additional types of information. For a given attribute, the result of the function can depend on the value of the given attribute, producing a tag or hierarchy of tags that characterize the given attribute. Or, the function can ignore the given attribute or apply a wildcard to permit any value for the given attribute. Section III describes examples of functions that can be used when mapping (323) records to nested sets of tags.

The network analysis tool uses (324) association rule learning to extract frequent item sets from the nested sets of tags for the records. The association rule learning is machine learning that identifies frequently-occurring sets of tags. For example, for a given item set in the nested sets of tags for the records, the network analysis tool determines support of the given item set and compares the support of the given item set to a threshold. The threshold depends on implementation but generally has a value between 0% and 100%. Typical values for the support threshold are 10%, 15%, and 20%. The support threshold can be a user-specified threshold that is tracked as a control parameter. Section III describes examples of ways to compute support for item sets and perform other operations when using (323) association rule learning to extract frequent item sets from the nested sets of tags for the records.

Finally, the network analysis tool determines (325) the one-hop network behavior based on the frequent item sets. In doing so, the network analysis tool can identify, among the set of network assets, subsets of network assets having similar one-hop network behavior based on a measure of dissimilarity (or measure of similarity) between pairs of the frequent item sets. Section III describes examples of dissimilarity measures that can be used when determining (325) one-hop network behavior based on the frequent item sets.

With reference to FIG. 3a, in a second workflow, the network analysis tool identifies (330) multi-hop network dependencies between at least some of the set of network assets based on a second evaluation of the network flow information. For example, the network analysis tool identifies (330) multi-hop network dependencies between network assets using the approach shown in FIG. 3c, which uses deep learning, or another workflow. FIG. 3c illustrates example stages (331) of processing performed when identifying multi-hop dependencies between network assets with a deep learning workflow.

With reference to FIG. 3c, when evaluating network flow information as part of the second workflow, the network analysis tool can pre-process (332) the network flow information to produce input vectors. Examples of pre-processing stages in the deep learning workflow are described below with reference to FIG. 14. The pre-processing (332) can include various stages. For example, the pre-processing (332) includes one or more of: (a) converting unidirectional flow information to bidirectional flow information; (b) windowing the network flow information using a time interval; (c) categorizing network flows based on attributes of the network flow information; (d) identifying instances of temporally proximate co-occurrences within the network flow information based on an ensemble approach; (e) checking that categorization of the network flow information is stable over a period of time; (f) combining instances of temporally proximate co-occurrences within the network flow information into higher-order combinations; (g) encoding such higher-order combinations as the input vectors; and/or (h) annotating the input vectors with details about the network flow information (such as network addresses). Alternatively, the pre-processing (332) includes other and/or additional stages. Thus, each of the input vectors can include, for a given time period, information indicating the extent of co-occurrence of activity between network assets, in various combinations, during the given time period.

When categorizing a network flow based on its attributes (see stage c), the network analysis tool can assign one of multiple categories as a function of the attributes of a record of the network flow information. For example, the attributes are source address, source port (or other transport-level attribute for the source), destination address, destination port (or other transport-level attribute for the destination) and/or protocol. Examples of rules that can be applied during categorization are described with reference to FIG. 14. Alternatively, the network analysis tool applies other and/or additional rules when categorizing records of network flow information.

When identifying instances of temporally proximate co-occurrences within network flow information based on an ensemble approach (see stage d), the ensemble approach can use mutual information analysis, co-occurrence matrices followed by signal strength enhancement (such as normalization for statistical significance, e.g., z-score normalization), clustering (e.g., using a self-organizing map), auto-correlation/cross-correlation analysis, cepstrum analysis, probability analysis (e.g., Bayesian statistics), information-theoretic entropy analysis (e.g., Shannon entropy, Renyi entropy), and/or another approach. The instances of temporally proximate co-occurrences can be organized as a set of pairs of categorized records of the network flow information. Or, the instances of temporally proximate co-occurrences can be organized in some other way.

When encoding higher-order combinations as input vectors (see stage g), the encoding can indicate, for a given one of multiple possible higher-order combinations in a time interval, the presence or absence of the given higher-order combination in the time interval. Or, as another example, the encoding can indicate the count of the given higher-order combination in the time interval. Or, the network analysis tool can encode information about the higher-order combinations in an input vector in some other way.

After the pre-processing (332), the network analysis tool can use (333) deep learning to extract patterns in the input vectors. In general, the deep learning is machine learning that models high-level abstractions in the input vectors. The deep learning can use modeling architectures with non-linear transformations. When it uses deep learning, the network analysis tool can apply a neural network to reveal similarities between the input vectors. For example, when it applies the neural network, the network analysis tool trains a SOM using the input vectors. Such training produces weight vectors for nodes of the SOM, where the weight vectors indicate the similarities between the input vectors. Alternatively, the network analysis tool uses another form of neural network for the deep learning, or the network analysis tool uses some other form of deep learning.

The network analysis tool determines (334) the multi-hop network dependencies based on the extracted patterns. The multi-hop network dependencies can be recurrent temporal sequence-based patterns, where a recurrent temporal sequence-based pattern is a randomly-initiated, repeating sequence of time-dependent elements. For example, as part of the deep learning, a neural network produces output vectors, which the network analysis tool summarizes. To summarize the output vectors, the network analysis tool can perform hierarchical clustering on the output vectors (weight vectors) produced by the neural network. Such summarizing can make the identification of dependencies more robust over time. The network analysis tool can then associate the clustered output vectors with corresponding details about the network flow information. Alternatively, the network analysis tool summarizes output vectors in some other way.

Alternatively, the network analysis tool can identify (330) multi-hop network dependencies between network assets using a cross-correlation/peak detection workflow. For example, as further described in Section V, the network analysis tool can pre-process the network flow information to produce time series of information for flow aggregates. Such pre-processing can include various stages, such as one or more of: (a) windowing the network flow information using a time interval; (b) aggregating network flows based on attributes of the network flow information; (c) encoding time series of count values for flow aggregates; and/or (d) annotating the flow aggregates with details about the network flow information (such as network addresses). Alternatively, the pre-processing includes other and/or additional stages. After the pre-processing in the cross-correlation/peak detection workflow, the network analysis tool can calculate cross-correlation coefficients between the time series of information for flow aggregates. When determining the cross-correlation coefficients, the network analysis tool can perform convolution operations (e.g., using a fast Fourier transform ("FFT") or other forward transform, and an inverse FFT or other inverse transform). The cross-correlation coefficients can be smoothed, e.g., using Lanczos smoothing factors, to reduce noise. Then, by determining whether a peak exists in the cross-correlation coefficients, the network analysis tool can determine the multi-hop network dependencies based on the cross-correlation coefficients.

Finally, returning to FIG. 3a, the network analysis tool outputs (340) results of the identifying the one-hop network behavior and/or results of the identifying the multi-hop network dependencies. For example, one-hop network behavior can be shown by rendering a heat map of dissimilarity scores (or similarity scores) of network assets. The heat map can include annotations that show details about network assets (e.g., names of computer systems, network addresses, or protocol information shown as labels for the network assets). As another example, multi-hop dependency relationships can be shown in a graphical model of a network, where the graphical model is a diagram in which vertices represent network assets and edges represent dependency relationships. The graphical model can further include annotations that show details about network assets (e.g., names of computer systems, network addresses, or protocol information shown as labels for the network assets) and/or show an assessment of criticality of the network assets, respectively. Alternatively, the network analysis tool outputs (340) results of the identifying the one-hop network behavior and/or results of the identifying the multi-hop network dependencies in some other way.

Using updated network flow information, the network analysis tool can repeat the process shown in FIG. 3a, so as to update an assessment of the one-hop network behavior and the multi-hop network dependencies on a near real-time basis.

III. Identifying One-Hop Network Behavior Using Association Rule Learning.

In network analysis, one-hop interactions for a given network asset do not necessarily cause subsequent network accesses. An example is a simple web application that does not require external resources. One-hop interactions are not accurately summarized in certain network analysis approaches that focus on detection of multi-hop interactions.

This section describes innovations in the area of network analysis, in which a network analysis tool receives network flow information and uses association rule learning to summarize one-hop interactions to and/or from a network asset (e.g., node, service). The network analysis tool "contextualizes" records of network flow information, mapping records of network flow information to nested sets of tags in a nominal set space. The nested sets of tags, in turn, yield item sets for association rule learning. In general, an item set is a set of items that occur together in a transaction. With association rule learning, patterns of significant one-hop interactions, manifested as frequent network access events, are observed as frequent item sets in flow records. By identifying frequently-occurring item sets with nested sets of tags for flow records, the network access tool can identify significant behaviors of network assets. In this context, the term "significant" denotes behavior that exceed a threshold (e.g., user-specified threshold) for frequency. The network analysis tool can use the identified network behavior to determine which network assets exhibit similar (or dissimilar) behavior. Depending on implementation, a network analysis tool incorporating one of the innovations described in this section can provide one or more of the following advantages.

- Based on the identified one-hop network behavior, the network analysis tool can discover patterns of similar communication among different network assets. This, in turn, can inform decisions about deploying patch sets, mitigating damage or risks, configuring a system, or detecting anomalous patterns that may indicate compromise of the computer network or network assets.
- Based on the identified one-hop network behavior, the network analysis tool can "fingerprint" network assets and subsequently identity network assets based on their contextualized network behavior.
- The network analysis tool can work by observing network activity (network traffic), without intervening in network activity or perturbing network activity. The network analysis tool can identify one-hop network behavior without imposing a performance penalty or logistic penalty.
- The network analysis tool can use network flow information that is readily available in most computer networks. For example, the network analysis tool uses information available from routers in a computer network, such as network flow information in a NetFlow or IPFIX format.
- The network analysis tool can use network flow information that summarizes network activity, without tracking or caching individual packets in a computer network. In addition to simplifying the analysis process, this can alleviate privacy concerns and security concerns.
- The network analysis tool can update its assessment of one-hop behavior of network assets on a near-real-time basis, using network flow information from a recent time period to give a near-current perspective on the state of a computer network. By reacting to network changes, this can further improve the quality and speed of decision-making processes based on the identified one-hop network behavior.

In general, using one or more of the innovations described in this section, a network analysis tool can discover similarities in the one-hop behavior of different network assets from network flow information. Similarities in behavior can be shown in a heatmap or other graphical representation of network assets. The graphical representation can further include annotations that show details about network assets (e.g., names of computer systems, network addresses, or protocol information shown as labels for the network assets). Alternatively, results can be summarized, reported, etc. in some other way.

A. Example Software Architecture for Identifying One-Hop Network Behavior Using Association Rule Learning.

Figure 4:
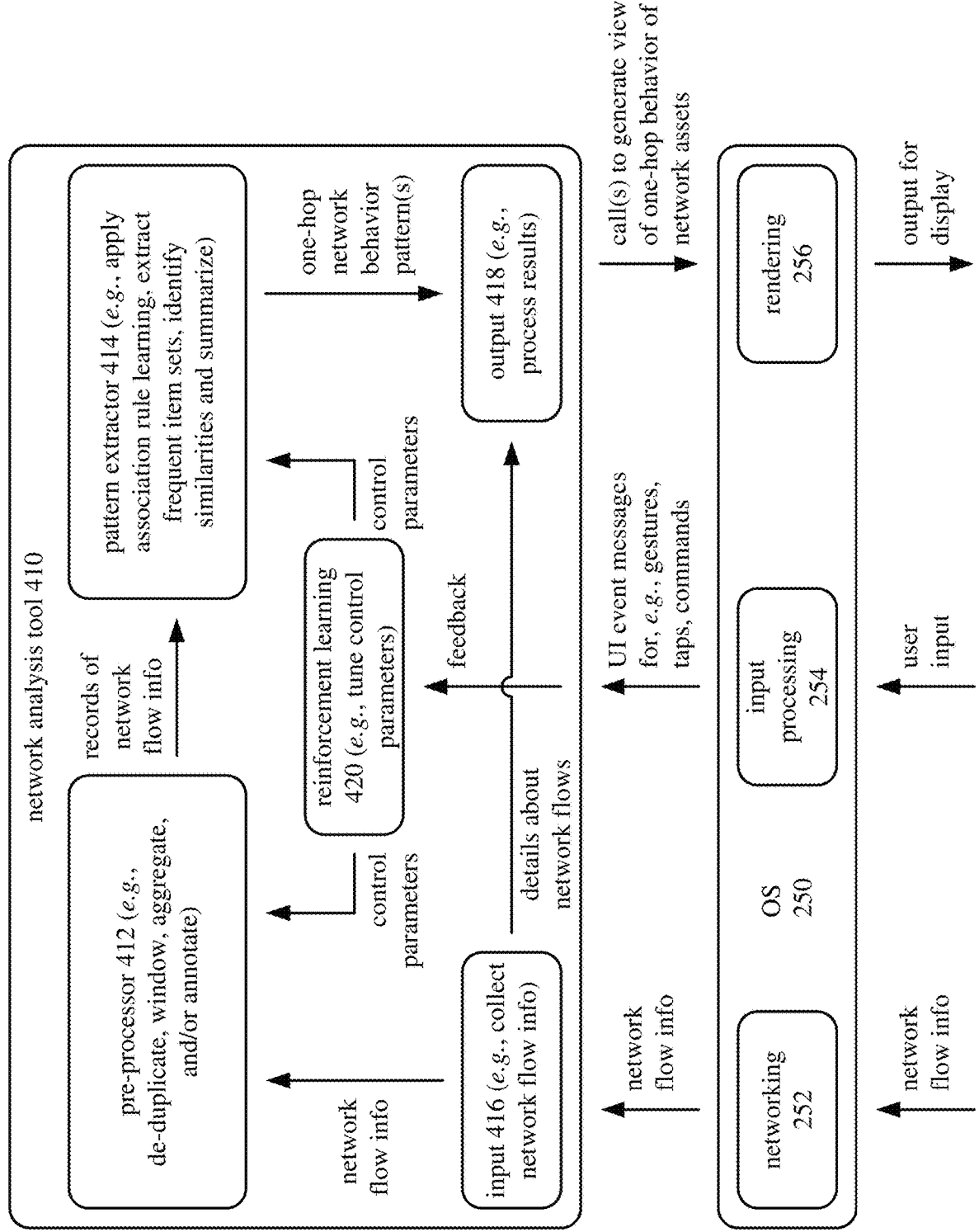
FIG. 4 is a block diagram illustrating an example software architecture in which a network analysis tool is configured to use association rule learning to identify one-hop network behavior of network assets.

FIG. 4 shows an example software architecture (400) for a network analysis tool (410) that works with an OS (250) to identify one-hop network behavior of network assets (e.g., nodes, services) using association rule learning. A computing system (e.g., smartphone, tablet computer, personal computer, or other computing system) can execute software organized according to the architecture (400).

The architecture (400) includes an OS (250) and a network analysis tool (410) that uses services of the OS (250). As described with reference to FIG. 2, the OS (250) includes components for rendering (e.g., rendering visual output to a display), components for networking, and components for input processing, as well as other components of the OS (250) that are not shown. In general, the OS (250) manages user input functions, output functions, storage access functions, network communication functions, and other functions for the computing system, as described with reference to FIG. 2. The OS (250) provides access to such functions to the network analysis tool (410) and other software running on the computing system.

In a networking module (252), the OS (250) receives network flow information from one or more network probes of a computer network, as described with reference to FIG. 2. The networking module (252) can provide the network flow information to the input module (416) of the network analysis tool (410) by passing the messages. Or, the networking module (252) can extract the network flow information from the messages and provide the network flow information directly to the input module (416) of the network analysis tool (410).

In an input processing module (254), the OS (250) includes functionality for recognizing taps, finger gestures, or other input to a touchscreen, recognizing commands from voice input, mouse input, button input or key press input, and creating messages that can be used by the network analysis tool (410). The network analysis tool (410) listens for UI event messages from the OS (250), which indicate UI events. If appropriate, the network analysis tool (410) can react to the user input (or another type of notification) by making one or more calls to the OS (250) or performing other processing. In particular, based on user input, a reinforcement learning module (420) of the network analysis tool (410) can tune control parameters for pre-processing and/or pattern extraction.

The network analysis tool (410) includes a pre-processor (412), a pattern extractor (414), an input module (416), an output module (418), and a reinforcement learning module (420). Overall, the network analysis tool (410) receives network flow information, identifies one-hop behavior of network assets of a computer network using an association rule learning workflow, and outputs results of the identification of the one-hop network behavior.

The input module (416) receives network flow information (e.g., as part of messages, as records of network flow information) from the networking module (252) of the OS (250). The input module (416) collects the network flow information and provides it to the pre-processor (412).

The pre-processor (412) receives the network flow information from the input module (416) and processes the network flow information to produce flow records for the association rule learning workflow. One or more control parameters can control stages of processing in the pre-processor (412). For example, the pre-processor (412) performs stages of processing to: (a) de-duplicate the network flow information, (b) selectively combine unidirectional flows into bidirectional flows, where appropriate; (c) window the network flow information; and/or (d) annotate the flow records. Additional details for such stages of pre-processing in some examples are described with reference to FIG. 6. Alternatively, the pre-processor (412) performs other and/or additional stages of pre-processing. The pre-processor (412) provides the flow records to the pattern extractor (414).

The pattern extractor (414) uses the association rule learning workflow to extract patterns in the flow records provided by the pre-processor (412). The association rule learning is a set of coordinated machine learning approaches that identify frequently-occurring sets of tags. One or more control parameters can control stages of processing in the pattern extractor (414). For example, the pattern extractor (414) maps flow records to nested sets of tags for the flow records, determines support for respective items sets derived from the nested sets of tags in the flow records, and determines which item sets are significant (that is, have support that satisfies a support threshold, which can be specified by a user as a control parameter). The pattern extractor (414) can then calculate similarity between different network assets and identify network assets that have similar one-hop network behavior. Additional details for such stages of pattern extraction in some examples are described with reference to FIGS. 7 and 8. Alternatively, the pattern extractor (414) performs other and/or additional stages of pattern extraction using different association rule learning operations. The pattern extractor (414) provides one or more one-hop network behavior patterns to the output module (418).

The output module (418) receives the one-hop network behavior pattern(s) from the pattern extractor (414). The output module (418) can also receive details about the network flows in the network flow information. Such details can be added to the flow records (as labels or other annotations) by the pre-processor (412). Or, such details can be passed directly by the input module (416). In any case, the output module (418) processes the network behavior pattern(s) (and other details about the network flows) to make one or more calls to the OS (250) to generate a view of the one-hop behavior of the network assets of the computer network.

In a rendering module (256), the OS (250) handles the call(s) from the output module (418) of the network analysis tool (410) to generate a view of the behavior of the network assets of the computer network. For example, the rendering module (256) renders a heatmap or other graphical depiction of network assets. For the heatmap, color-coded values can indicate similarity/dissimilarity between different network assets. The graphical depiction can also include annotations to show details about network assets (e.g., names of computer systems, network addresses, or protocol information shown as labels). Alternatively, the behavior of network assets of a computer network can be shown in some other form of graphical representation.

The reinforcement learning module (420) sets control parameters for the pre-processor (412) and/or the pattern extractor (414), and can hence provide feedback within the network analysis tool (410). The feedback can influence the pipeline of processing within the network analysis tool (410), thereby improving accuracy of the network analysis. Initially, the control parameters can have default values or values from a prior session of network analysis. The reinforcement learning module (420) can then tune the control parameters based on user input, e.g., reacting to a graphical model rendered by the rendering module (256). For example, through input to a graphical user interface, an analyst (user) can select network assets, combinations of network assets, or behavior that should be ignored in subsequent analysis. Or, as another example, through input to a graphical user interface, the analyst (user) can select network assets, combinations of network assets, or behavior that should get extra attention, weight or detail in subsequent analysis because such network assets, combinations, behavior, etc. are of particular interest to the analyst, or are confirmed to be part of meaningful results. The reinforcement learning module (420) can also tune control parameters based on feedback from within the network analysis tool (410), e.g., based on thresholds defined so as to remove from consideration events that are insignificant or are outliers.

The control parameters used within the network analysis tool (410) depend on implementation. For example, the control parameters can include: (1) a control parameter that controls how flow records are de-duplicated, aggregated, selectively combined, etc. in pre-processing; (2) one or more control parameters that control the function used when mapping flow records to nested sets of tags (e.g., which attributes are considered in the function, how wildcards are used in the function); and/or (3) a control parameter that controls which values of support are deemed to be significant. Alternatively, the control parameters include other and/or additional control parameters.

Alternatively, the OS (250) includes more or fewer modules. Or, the network analysis tool (410) includes more or fewer modules. A given module can be split into multiple modules, or different modules can be combined into a single module.

B. Example Network Flow Info Records, Nested Tag Sets, and Item Sets.

FIG. 5 shows a simplified record (510) of network flow information. The simplified flow record (510) includes values for five attributes—source address, source port, destination address, destination port, and protocol. In FIG. 5, the source address and destination address are network addresses (specifically, IPv4 addresses). Alternatively, the network addresses can be IPv6 addresses or other network addresses. The protocol can be TCP, UDP, or another protocol. For the sake of simplicity, other attributes of the simplified flow record (510) (e.g., timestamps for start and end times, count of bytes or packets) are not shown. In practice, a record of network flow information can be in a NetFlow, IPFIX format, or other format, and it can have other and/or additional attributes. In typical use scenarios, thousands or even millions of flow records may be collected. A flow record, as a data type, can include attributes that indicate source address, source port, destination address, destination port, protocol, start time, end time, a count of bytes/octets or packets, and/or other features of network flow information.

FIG. 5 also shows an example nested set of tags (520), which is created by mapping the simplified flow record (510) according to a function. Tags can be hierarchically organized in various ways. In the example nested set of tags (520), the asterisk symbol represents a wildcard that covers any possible value for an attribute. Aside from the wildcard, a subnet mask can be used to represent a group of network addresses after a network prefix. For example, the tag 10.12.10.00/08 represents any of the IP addresses in the range 10.12.10.00 to 10.12.10.FF. Finally, a group of values can be covered by a higher-level tag. For example, the tag "HTTP/HTTP alternates" represents a set of three ports that may be used by a Web server for HTTP—the HTTP port 80 as well as alternate HTTP ports 8008 and 8080.

In FIG. 5, for the source address, the hierarchy of tags for the simplified flow record (510) is, from broadest to narrowest: *, 10.12.00.00/16, 10.12.10.00/08, 10.12.10.137. For the source port, the hierarchy of tags for the simplified flow record (510) is: *, 49253. For the destination address, the hierarchy of tags is: *, 172.22.00.00/16, 172.22.91.15. For the destination port, the hierarchy of tags for the simplified flow record (510) is: *, HTTP/HTTP alternates, 80. Finally, for the protocol, the hierarchy of tags for the simplified flow record (510) is: *, TCP. Different attributes can have different numbers of tags in an associated hierarchy.

In practice, depending on the function used to map a record of network flow information to a nested set of tags, the nested set of tags can include more or fewer tags per attribute. In some cases, an attribute can have a single tag associated with it (e.g., a wildcard if any value is permitted according to the rule, or a specific value if only one value is permitted according to the rule).

FIG. 5 also shows example item sets (530) for input to association rule learning. Each of the example item sets (530) can be derived by following a path through the nested set of tags (520), selecting one possible tag per attribute. Selecting the wildcard is equivalent to skipping the attribute, since any possible value matches. In FIG. 5, the first example item set includes the values 10.12.00.00/16, *, 172.22.00.00/16, HTTP/HTTP alternates, and TCP. The second example item set is more specific in terms of destination address: 10.12.00.00/16, *, 172.22.91.12, HTTP/HTTP alternates, and TCP. The third example item set is even more specific in terms of source address and destination port: 10.12.10.137, *, 172.22.91.12, 80, and TCP.

In subsequent association rule learning, the network analysis tool may determine how frequently the different example item sets occur among records of network flow information. The third example item set, being the most specific, can be no more frequent than the second example item set. That is, whenever the third example item set is contained in a flow record, the second example item set is also contained in the flow record. In addition, the second example item set may also be contained in a flow record (such as 10.12.10.131, 43883, 172.22.91.12, 8008, and TCP) that does not contain the third example item set. The first example item set, being the most general, is at least as frequent as the second example item set in the flow records.

C. Example Stages of Pre-Processing for Association Rule Learning Workflow.

Figure 6:
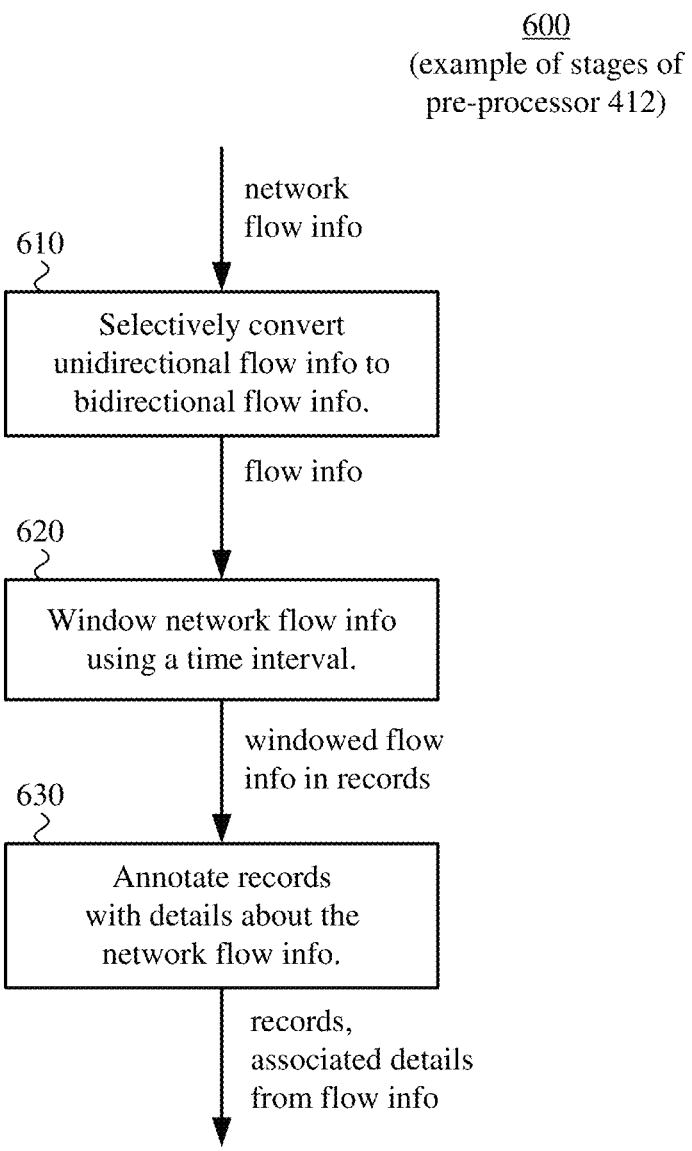
FIG. 6 is a block diagram illustrating example stages of pre-processing in the network analysis tool of FIG. 4, for an association rule learning workflow.

FIG. 6 shows example stages (600) of pre-processing by the pre-processor (412) of FIG. 4. A network analysis tool can perform all of the example stages (600) of pre-processing shown in FIG. 6. Or, the network analysis tool can perform a subset of the example stages (600) of pre-processing shown in FIG. 6. Overall, the stages (600) of pre-processing convert network flow information into a form suitable for machine learning by the pattern extractor (414) (for the association rule learning workflow).

With reference to FIG. 6, after collecting network flow information (as described above), the network analysis tool selectively converts (610) unidirectional flow information to bidirectional flow information, combining flows where appropriate to do so. For example, the network analysis tool sorts records of network flow information by start time, identifies any pair of unidirectional flows (within some defined range of start times) in which start addresses and destination addresses are switched (flows in opposite directions), and aggregates packet data for that pair of unidirectional flows into a single bidirectional flow. Combining unidirectional flows into bidirectional flows can simplify later processing by significantly reducing the number of network flows considered. Some unidirectional flows do not have a matching unidirectional flow in the opposite direction. Such a unidirectional flow can nevertheless be summarized as a bidirectional flow. Or, the network analysis tool can simply discard network flow information for a unidirectional flow that lacks a matching unidirectional flow in the opposite direction.

The network analysis tool can also perform data deduplication (not shown) to remove redundant flow records.

The network analysis tool windows (620) network flow information using a time interval. The network analysis tool segments network flows into windows having the time interval. The duration of the time interval depends on implementation. For example, the time interval is 5 seconds, 30 seconds, 120 seconds, 10 minutes, 30 minutes or some other duration of time. In some examples, the network analysis tool converts flow records into a vector representation of n-tuples in a given time interval. For example, the n-tuple for a network flow includes: ($time_{start}$, $time_{end}$, $addr_{src}$, $addr_{dst}$, $ID_{protocol}$, $port_{src}$, $port_{dst}$). The addresses can be IP addresses, and the ports can be TCP or UDP ports. Alternatively, the n-tuple includes other and/or additional attributes. With windowing, flow information for streaming, real-time applications can be summarized into sets based on time and analyzed on a near-real-time basis.

The network analysis tool can annotate (630) the flow records with details about the network flow information. For example, the network analysis tool adds labels about network flows in hidden columns of the flow records. This produces flow records with associated details from the network flow information.

The network analysis tool can omit one or more stages of the pre-processing. For example, the network analysis tool can skip the selective conversion to bidirectional flows. In some examples, the flow records input to the association rule learning workflow are unidirectional flows. Or, the network analysis tool can skip the annotation. In the pre-processing shown in FIG. 6, network flow information is windowed according to a time interval. Alternatively, network flow information can be partitioned by criteria other than time.

D. Example Stages of Pattern Extraction for Association Rule Learning Workflow.

To identify one-hop network behavior as part of the association rule learning workflow, the pattern extractor (414) of FIG. 4 performs multiple stages of operations. In a first stage, the pattern extractor (414) "contextualizes" records of network flow information, producing nested sets of tags for the flow records. In a second stage, the pattern extractor (414) "characterizes" the behavior of network assets, identifying significant one-hop communication patterns by applying association rule learning to item sets derived from the nested sets of tags for the flow records. Finally, in a third stage, the pattern extractor (414) identifies network assets that have similar one-hop communication patterns.

1. Mapping Flow Records to Nested Tag Sets.

The input to the "contextualization" stage is records of network flow information. For example, for this stage, a flow record can be modeled as a 6-element tuple $\vec{r}$, which is ($time_{start}$, $IP_A$, $IP_B$, PROT, $PORT_A$, $PORT_B$). The $time_{start}$ attribute indicates the start time of the flow for the flow record. A and B are communicating entities (e.g., services, applications, etc. for source and destination). The attributes $IP_A$ and $IP_B$ denote network addresses for the communicating entities, and the attributes $PORT_A$ and $PORT_B$ are transport port identifiers for the respective network addresses. The attribute PROT is a protocol identifier (e.g., TCP, UDP). A flow record can represent a bidirectional flow (biflow), for which information on both upstream and downstream traffic of bidirectional communication is aggregated and summarized, as explained above. Or, the flow record can represent a conventional, unidirectional flow.

Conceptually, the network analysis tool contextualizes records of network flow information with networking principals and organization-specific attributes. In practice, for a given flow record, this is accomplished by mapping the attributes of the flow record to a nested set of tags (labels) that describe functions or relationships. A tag set is a set of nominal elements. A tag set can be the empty set. In some example implementations, arithmetic over a tag set is not defined, and the order of the elements is immaterial. A function $f:\{\vec{r}\} \to N \times T$ maps a flow record to a partition key $k \in N$ and a nested set of tags $T \in T$. The partition key k is an ordinal number that designates different partitions (subsets) of the set of flow records. $T_i$, for i=1, 2, ..., n, is a nominal set of tags associated with one of the partitions. The sets of tags are disjoint. That is, $\forall i \neq j, T_i \cap T_j$=empty set. The term $P(T_i)$ denotes the power set of $T_i$. T is the Cartesian product of the respective power sets $T_i$ for i=1, 2, ..., n. That is, $T:=P(T_1) \times P(T_2) \times P(T_3) \times ... \times P(T_n)$.

With the function $f$, the network analysis tool can partition the set of flow records into disjoint subsets (partitions), which are designated with partition key k. For example, the network analysis tool can divide the set of flow records into subsets associated with different values of the first network address ($IP_A$), to set up later analysis of one-hop network behavior from each different network address as a source and/or to that network address as a sink. Or, the network address tool can divide the set of flow records into subsets by combination of first network address ($IP_A$) and protocol. Or, the network analysis tool can divide the set of flow records into subsets by combination of first network address ($IP_A$), protocol, and port ($PORT_A$), to set up later analysis of communication to and/or from a specific address/port/protocol combination. Or, the network analysis tool can divide the set of flow records into subsets by some other combination of attributes.

With the function $f$, the network analysis tool contextualizes the behavior of each subset (partition) of flow records. The function $f$ maps flow records for subsets to nested sets of tags for the respective subsets, consistent with the partitioning scheme. The function $f$ can be constructed according to various criteria.

- In the tag set, a network address can be an IPv4 address or IPv6 address. Or, the function $f$ can reflect the logical location or usage of the host. For example, a tag set can indicate $IP_A$ is a host in "human resources" and $IP_B$ is a host in the "data center." Thus, a network address can be replaced with a logical name in a tag set, with the logical name being a label provided by user. Similarly, labels defined by a user or according to network engineering conventions can be applied to ports, protocol, or other attributes.
- The function $f$ can ignore all of an attribute (or multiple attributes) of flow records. For example, a client's port is often randomly assigned (i.e., it is an ephemeral port), and typically does provide useful information in support of analysis. To focus on outgoing communications from a network asset in unidirectional flow records, the function $f$ can ignore source port. Given clients requesting services from Web servers listening for TCP connections on port 80, 8008, or 8080, the function $f$ can be constructed to ignore the ephemeral port and then potentially map the flow records to tag sets {tcp: www; tcp: 80}, {tcp: www; tcp: 8008}, and {tcp: www; tcp: 8080}. The function $f$ can use a wildcard to ignore an attribute of a flow record, since any value for that attribute is permitted.
- The function $f$ can selectively ignore part of an attribute of flow records. For example, the function $f$ can incorporate subnet masks or hierarchical tags to designate a set of network addresses or ports.

Thus, given a set of flow records $\{\vec{r}\}$, the network analysis tool computes a function $\{f(\vec{r})\}$ to map flow records to nested sets of tags for subsets (partitions) of the flow records. For the respective partitions k, the network analysis tool obtains nested sets of tags $\{T\}_k$.

2. Identifying One-Hop Network Behavior for Network Assets.

Figure 7:
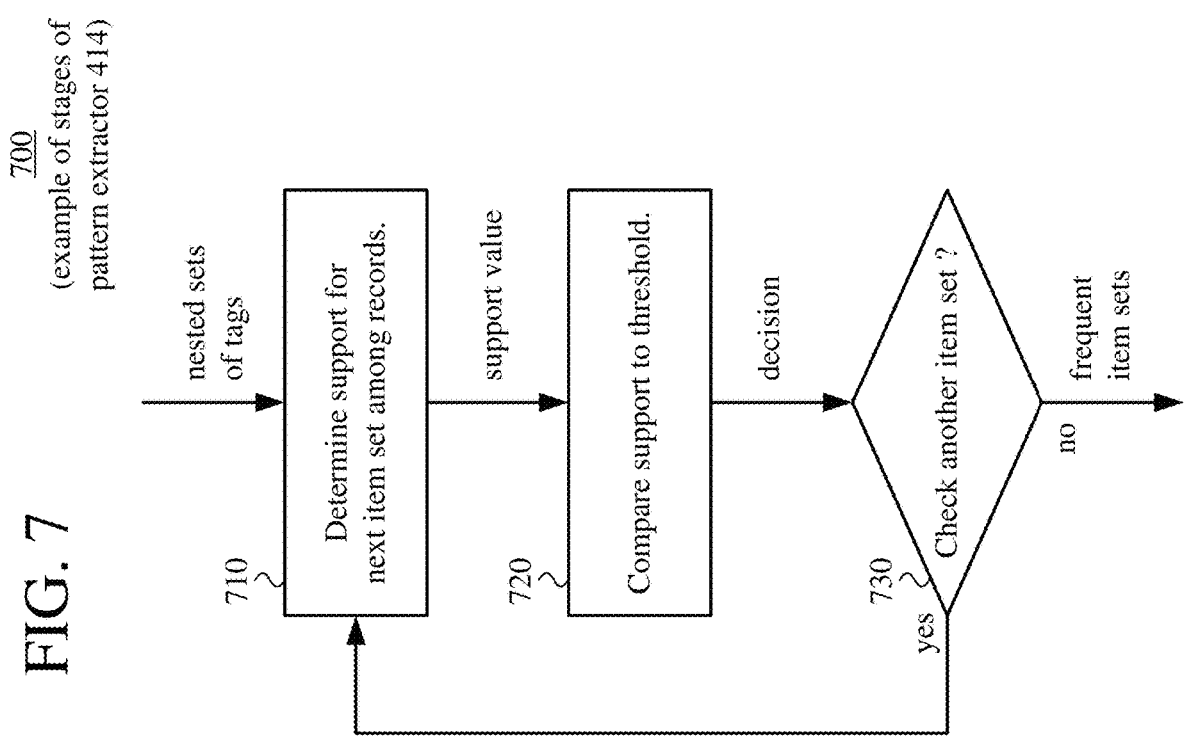

FIG. 7 shows example stages (700) of association rule learning by the pattern extractor (414) in the network analysis tool (410) of FIG. 4. A network analysis tool can perform all of the example stages (700) of pattern extraction shown in FIG. 7 when determining frequent item sets for a subset (partition) of flow records. Or, the network analysis tool can perform a subset of the example stages (700) of pattern extraction shown in FIG. 7. Overall, for a network asset associated with a partition (e.g., for a node or service at a network address), the stages (700) of pattern extraction mine frequent combinations from the tag sets that represent communications to and/or from the network asset. The frequent combinations form the basis of a fingerprint that characterizes the network asset's one-hop behavior, which can subsequently be used to identify other network assets with analogous behavior.

In general, the goal of mining frequent item sets is to find combinations of items that occur together within transactions in a database of transactions. This can provide insights into the behavior of the system that is producing the transactional input data. In the context of network analysis to identify one-hop network behavior, the transactions are flow records, and the items are tags that represent values of attributes of flow records. Frequent item set mining can follow a Frequent Pattern ("FP") Growth algorithm, so-called Apriori algorithm, or other algorithm to find item sets having significant support. In particular, the FP Growth algorithm is lightweight and scalable to support analysis of large volumes of flow records.

A nested set of tags for a partition k provides item sets that are evaluated against the flow records for the partition, in order to identify frequent item sets. For each nested set of tags $T \in \{T\}_k$, the network analysis tool derives one or more item sets that can be compared to flow records. The network analysis tool transforms the nested set of tags T into a transaction t by merging T's nested sets via mapping from $T \in P(T_1) \times P(T_2) \times P(T_3) \times ... \times P(T_n)$ to $t \in \cup_i P(T_i)$. The resulting transactions $\{t\}_k$ are then mined for frequent item sets.

With reference to FIG. 7, the network analysis tool determines (710) the support for an item set among the subset (partition) of flow records. The support of an item set is the proportion of the number of flow records that contain the item set (has values that exactly match the item set or, if the item set includes any higher-level tag(s), are within the higher level tag(s)) compared to the total number of flow records. More formally, the support of item set I in $\{t\}_k$ is $supp(I,\{t\}_k):=|\{t \in \{t\}_k | I \subseteq t\}|/|\{t\}_k|$. The resulting support value is a relative quantity in the interval [0, 1] (or, equivalently, 0% to 100%). For example, if an item set appears in one quarter of the flow records in a subset (partition), the support value is 25%.

A frequent item set is an item set that has a frequency greater than a support threshold, which depends on implementation. The support threshold can be specified by a user or application, and it can be represented with a control parameter. The support threshold can have a default value of 10%, 15%, 20%, or another value. More formally, a frequent item set is an item set whose support $supp(I,\{t\}_k) \geq \sigma$, where $\sigma$ indicates the support threshold. With reference to FIG. 7, the network analysis tool compares (720) the support value for an item set to the support threshold, yielding a decision about whether the item set is a frequent item set.

The network analysis tool decides (730) whether to continue by checking another item set. If so, the network analysis tool determines (710) the support for a next item set among the set of flow records. Otherwise (no more item sets to evaluate), the network analysis tool can produce information indicating the frequent item sets for the subset (partition) of flow records. The network analysis tool can repeat the stages (700) for another subset (partition) of flow records.

In frequent item set mining, the Apriori property is that infrequent item sets cannot have frequent supersets. That is, if an item set of n tags is infrequent in a set of flow records, then a superset that includes those n tags and p other tags (for an ordinal p≥0) cannot be frequent. This property can be used during frequent item set mining (including frequent item set mining according to the FP Growth algorithm) to efficiently search for frequent item sets. In some example implementations, the FP Growth algorithm also uses a prefix tree data structure, called an FP tree, to represent and act on information contained in flow records, which provides an efficient way to represent flow records and mine for frequent item sets.

A maximal frequent item set is a frequent set whose supersets all have support values that satisfy the support threshold. A closed frequent item set is a frequent item set whose supersets all have lesser support (than the frequent item set). The network analysis tool can use maximal frequent item sets and closed frequent item sets to obtain degrees of generalizations/abstractions of frequent combinations in the flow records.

The network analysis tool can use wildcard matches for fields that have network addresses and subnet masks (i.e., CIDR). Further, wildcard handling can be expanded to use partial ordering to better perform partial or fuzzy matches of various fields within item sets.

The network analysis tool can also perform association rule mining of frequent item set results to determine dependencies in terms of actionable rules. For example, the network analysis tool partitions each of the frequent item sets into two disjoint partitions to correspond to the antecedent and consequent of a rule. The support of a rule is called its confidence, and it is directly related to conditional probability due to it being a ratio of supports of the two frequent item subsets. A significant rule is a rule with a confidence that satisfies a rule confidence threshold, which depends on implementation. The rule confidence threshold can be supplied by a user or application, and it can be tracked as a control parameter. For example, the rule confidence threshold can be 10%, 15%, or another value.

3. Finding Network Assets that have Similar Network Behavior.

Figure 8:
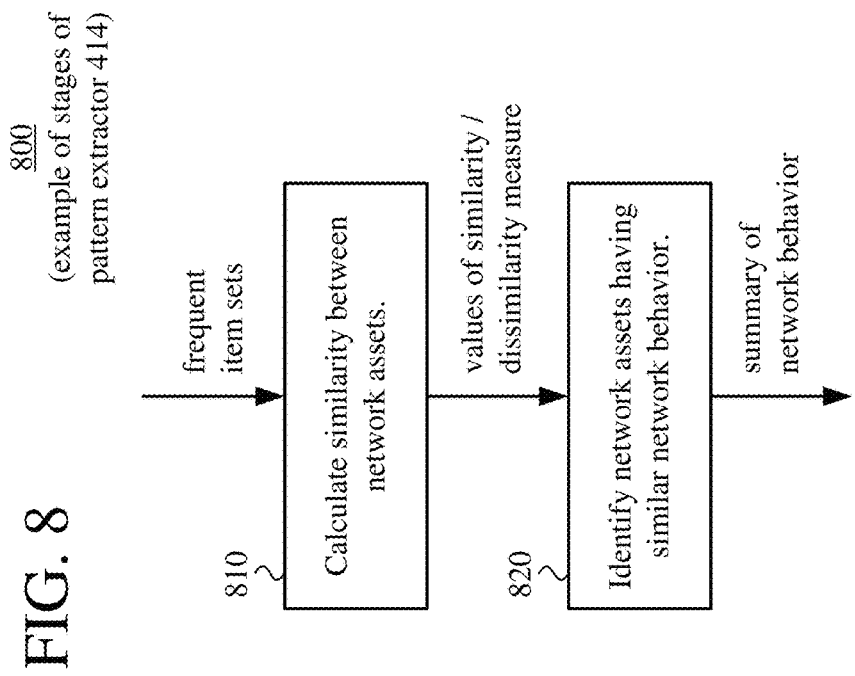
FIGS. 7 and 8 are block diagrams illustrating example stages of pattern extraction in the network analysis tool of FIG. 4, for an association rule learning workflow.

FIG. 8 shows example stages (800) of pattern extraction by the pattern extractor (414) in the network analysis tool (410) of FIG. 4. A network analysis tool can perform all of the example stages (800) of pattern extraction shown in FIG. 8. Or, the network analysis tool can perform a subset of the example stages (800) of pattern extraction shown in FIG. 8. Overall, the stages (800) of pattern extraction identify network assets that have similar one-hop network behavior according to a measure of similarity (or, equivalently, dissimilarity) between frequent item sets.

With reference to FIG. 8, from the frequent item sets, the network analysis tool calculates (810) similarity between network assets. For example, for each partition k, the network analysis tool has frequent item sets $\{I\}_k$. For a given pair of partitions k and k', the network analysis tool computes a pairwise distance score between k and k' that can be used to identify and cluster similar behaviors. The network analysis tool can compute pairwise distance scores between each possible pair of partitions, producing values of a similarity/dissimilarity measure.

For the pairwise distance score, the network analysis tool can use any of several different similarity (dissimilarity) measures, which typically yield a value in the range of 0.0 to 1.0. The measure helps to determine similarity between multiple network assets. Network assets that exhibit similar behavior will be closer—smaller values of the dissimilarity measure—than network assets that exhibit disparate behavior.

For the frequent item sets A and B of two partitions, one example dissimilarity measure dis1(A, B) uses a scaling parameter θ to adjust the significance of the support values:

$$dis1(A, B) = 1 - \frac{\sum_{X \in A \cap B} \max\{0, 1 - \theta * |supp_D(X) - supp_E(X)|\}}{|A \cup B|}$$

Another example dissimilarity measure dis2(A, B) quantifies deviation between two datasets in terms of the frequent item sets that are induced. This example dissimilarity measure relies on the union between frequent item sets A and B:

$$dis2(A, B) = \frac{\sum_{X \in A \cup B} |supp_D(X) - supp_E(X)|}{\sum_{X \in A} supp_D(X) + \sum_{X \in B} supp_E(X)}$$

The example dissimilarity measures dis1(A, B) and dis2(A,B) do not allow partial matches of item sets, which limits their usefulness in the context of identification of similar one-hop network behaviors. A third example dissimilarity measure dis3(A, B) allows partial matches of item sets. The network analysis tool can calculate a pairwise distance score between frequent item sets $\{I\}_k$ and $\{I\}_{k'}$ for partitions k and k', respectively, using the third example dissimilarity measure dis3(A, B). The third example dissimilarity measure dis3(A, B) is computed as: dis3($\{I\}_k$, $\{I\}_{k'}$):=1−2d$_3$/(d$_1$+d$_2$), where $$d(A, B) = \frac{|A \cap B|}{|A \cup B|} \log_2\left(1 + \frac{|A \cap B|}{|A \cup B|}\right) \cdot \min(supp(A, \{t\}_k), supp(B, \{t\}_{k'})),$$

$$d_1 = \sum_{A,B \in \{I\}_k} d(A, B),$$

$$d_2 = \sum_{A,B \in \{I\}_{k'}} d(A, B), \text{ and}$$

$$d_3 = \sum_{A \in \{I\}_k, B \in \{I\}_{k'}} d(A, B).$$

If an exact match for an item set is not found in the compared set, a zero support for that item set is assumed while computing the function d.

With reference to FIG. 8, based on the values of the similarity/dissimilarity measure, the network analysis tool identifies (820) network assets having similar one-hop network behavior. This produces a summary of one-hop network behavior. For example, the summary can be presented as a heatmap, which is a two-dimensional arrangement of pairwise dissimilarity scores indexed by network asset. In the heatmap, a cell (asset$_A$, asset$_B$) can report the value of the dissimilarity measure dis(A, B) for a pair of network assets asset$_A$ and asset$_B$. Higher values can have a "hotter" color, while lower values have a "cooler" color. The network analysis tool can facilitate comparisons of the behavior of the network assets by clustering, in the heatmap, subsets of network assets that are similar according to pairwise dissimilarity scores.

E. Results for Example Implementations.

This section describes results of using an association rule learning workflow in an example implementation of a network analysis tool to identify one-hop network behavior in example scenarios for two different computer networks. In both example scenarios, the input to the network analysis tool is network flow information.

1. First Example Scenario.

The first example scenario shows one-hop network behavior and relationships between nodes in a cloud computing environment. The example computing environment is implemented as part of a test bed project for cybersecurity research and development, which can simulate enterprise computing environments, including virtual users that perform activities and interact with other entities in the environment. In the example computing environment, flowmeter probes are deployed at three positions in order to observe network communications to/from nodes. Network flow information is recorded over a 24-day period and, in total, 13.2 million flow records are exported. Specifically, probes are deployed at positions for nodes labeled "controller," "keystone," and "dbpool," which are chosen based on earlier assessments of prevalent communication patterns. The controller node provides many services, including the "nova" computing service and "neutron" networking service. The keystone node provides authentication, authorization, and service discovery services. Lastly, the dbpool node is a database pool manager, performing connection and load balancing for a cluster of PostgreSQL database management system ("DBMS") servers.

The collected flow information records are collated by node (controller, keystone, and dbpool) and then bifurcated by source and destination network addresses (that is, creating unidirectional flow records from/to the nodes, respectively). For each subset, a function $f$ maps network addresses, networks, protocol, and transport information onto the nested sets of tags. Then, the source behavior (outgoing traffic) and the sink behavior (incoming traffic) for each node (controller, keystone, and dbpool) are identified, using closed frequent item sets. The following table shows significant item sets generated for outgoing traffic, illustrating source behavior characteristics for the respective nodes. In the table (and other tables below), an asterisk represents a "wildcard"—it matches any non-numeric element in the field, such as network name or network address.

TABLE I

Outgoing Traffic from Nodes in First Example Scenario.

| Source Node | Destination Node | Destination Port | Destination Service Network | Support (threshold = 10%) |
|---|---|---|---|---|
| controller | * | tcp: 5671 | infrastructure | 11.0 |
|  | keystone | tcp: 35357 | infrastructure | 16.6 |
|  | keystone | tcp: * | infrastructure | 26.6 |
|  | dbbalance | tcp: 5432 | infrastructure | 27.1 |
|  | * | tcp: 5432 | infrastructure | 27.6 |
|  | services | udp: 53 | infrastructure | 34.4 |
|  | services | udp: * | infrastructure | 34.6 |
|  | * | tcp: * | infrastructure | 65.3 |

TABLE I-continued

Outgoing Traffic from Nodes in First Example Scenario.

| Source Node | Destination Node | Destination Port | Destination Service Network | Support (threshold = 10%) |
|---|---|---|---|---|
| dbpool | services | udp: 53 | infrastructure | 16.9 |
|  | services | udp: * | infrastructure | 17.0 |
|  | database2 | tcp: 5433 | infrastructure | 38.9 |
|  | database1 | tcp: 5433 | infrastructure | 44.0 |
|  | * | tcp: 5433 | infrastructure | 82.9 |
|  | * | tcp: * | infrastructure | 83.0 |
| keystone | amq | tcp: 5671 | infrastructure | 11.6 |
|  | services | udp: 53 | infrastructure | 14.9 |
|  | services | udp: * | infrastructure | 17.8 |
|  | * | tcp: 5671 | infrastructure | 29.1 |
|  | dbbalance | tcp: 5432 | infrastructure | 49.9 |
|  | * | tcp: * | infrastructure | 82.1 |

In general, services are unlikely to execute independently and often require the support of other services to function. Based on extracted item sets, the source behavior shown in Table I shows such relationships. The controller node uses the advanced message queuing ("AMQ") service provided through TCP port 5671 at one or more destination nodes, the keystone administrative API (a web service provided through TCP port 35357 at a destination node), and access to the DBMS through a cluster listening on TCP port 5432. The dbpool node is a source to database servers listening on TCP port 5433. The keystone node uses access to the DBMS and AMQ services at destination nodes. All three source nodes access domain name system ("DNS") services through UDP port 53 at destination nodes. In this example scenario, based on review of configuration files and results of service discovery, services are specified as logical names (such as AMQ, services, and dbbalance) rather than network addresses.

Figure 9A:
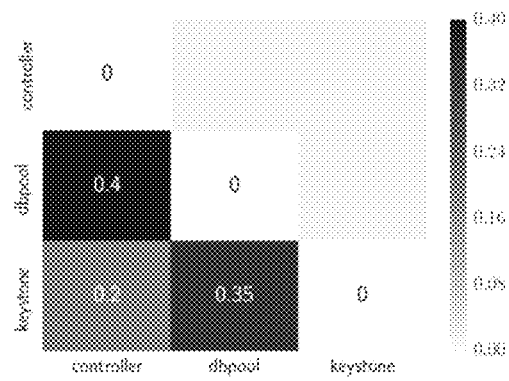
FIGS. 9a and 9b are diagrams illustrating similarity between network assets in a first example scenario.

FIG. 9a shows a heatmap of pairwise differences (dissimilarity scores) between the controller, keystone, and dbpool nodes for outgoing traffic, and thus characterizes similarity of their source behavior. In the heatmap, a cell (node$_A$, node$_B$) reports the value dis(node$_A$, node$_B$) of the dissimilarity measure for a pair of nodes. The value lies in the interval [0; 1]. The dissimilarity measure indicates similarity between the two nodes. Nodes that exhibit similar behavior will be closer—have smaller scores—than nodes that exhibit disparate behavior. For the example of FIG. 9a, all three nodes (controller, keystone, and dbpool) share some source characteristics, such as access to DNS services, and have relatively low dissimilarity scores with respect to each other. The controller and keystone nodes share more source characteristics, such as access to the AMQ service and DBMS services, and have the lowest score (0.2). Since the dbpool node communicates directly with the database servers, its behavior is relatively "more dissimilar" when compared to the behavior of the controller and keystone nodes, yielding scores of 0.4 and 0.35, respectively.

The following table shows significant item sets generated for incoming traffic of the controller, dbpool, and keystone nodes, illustrating sink behavior characteristics for the respective nodes.

TABLE II

Incoming Traffic to Nodes in First Example Scenario.

| Sink Node | Source Node | Port | Source Service Network | Support (threshold = 10%) |
|---|---|---|---|---|
| controller | ceilometer | tcp: 9696 | infrastructure | 10.9 |
|  | ceilometer | tcp: * | infrastructure | 13.9 |
|  | netbalance | tcp: 9696 | infrastructure | 13.2 |
|  | netbalance | tcp: * | infrastructure | 19.3 |
|  | * | tcp: 9696 | infrastructure | 38.8 |
|  | * | tcp: 8774 | infrastructure | 59.6 |
| dbpool | controller | tcp: 5432 | infrastructure | 88.7 |
|  | * | tcp: 5432 | infrastructure | 99.7 |
| keystone | controller | tcp: * | infrastructure | 12.2 |
|  | netbalance | tcp: 5000 | infrastructure | 42.9 |
|  | * | tcp: 5000 | infrastructure | 43.8 |
|  | netbalance | tcp: 35357 | infrastructure | 42.4 |
|  | * | tcp: 35357 | infrastructure | 49.6 |
|  | netbalance | tcp: * | infrastructure | 85.3 |

The controller node executes a neutron networking server, which listens on TCP port 9696, and a nova server, which listens on TCP port 8774. While the significant item sets account for all clients (captured by the wildcard in the Source Node attribute), significant item sets representing communications from netbalance and ceilometer nodes are specifically noted. The netbalance node is the gateway for clients to access public APIs. The ceilometer node collects and reports cloud computing telemetry, and it communicates extensively with these services, querying and aggregating a multitude of test points. The extracted item sets for dbpool and keystone correspond to the servers listening on them.

Figure 9B:
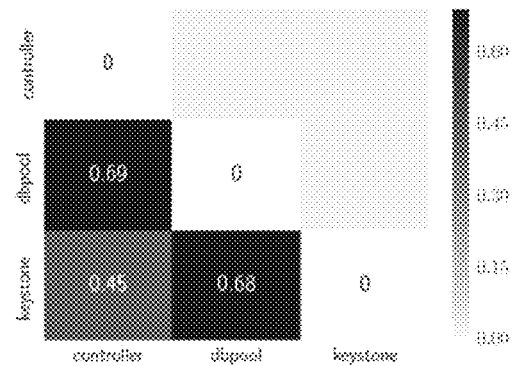

FIG. 9b shows a heatmap of pairwise differences (dissimilarity scores) between the controller, keystone, and dbpool nodes for incoming traffic, and thus characterizes similarity of their sink behavior. Compared to the scores shown in FIG. 9a, the dissimilarity measures for sink behavior are larger, which reflects the respective nodes exposing different services.

2. Second Example Scenario.

Figure 10:
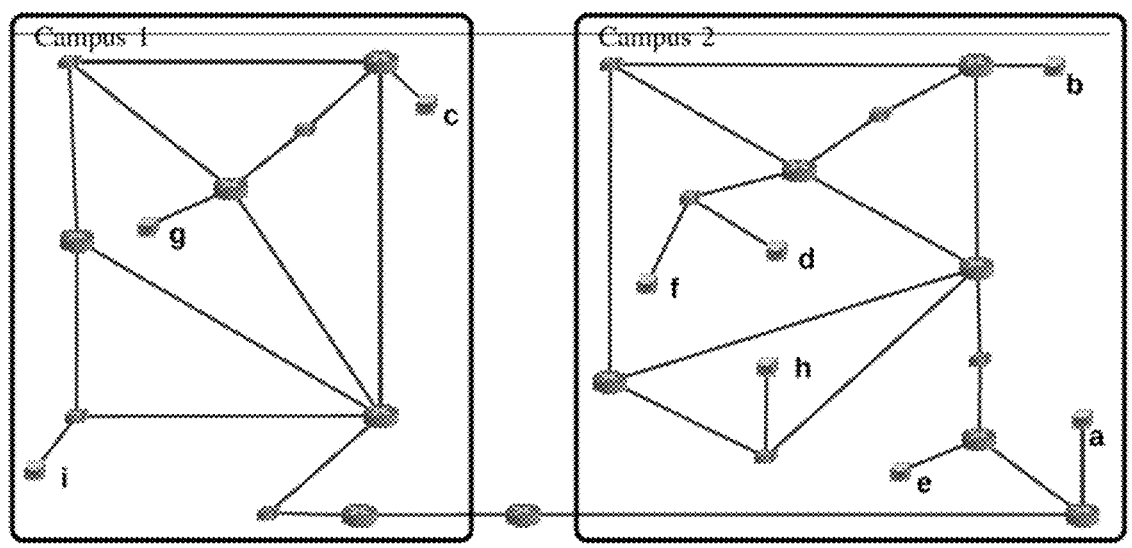
FIG. 10 is a diagram of a computer network in a second example scenario.

The second example scenario shows one-hop network behavior and relationships between nodes in a simple enterprise computing environment. The enterprise computing network is a virtual network modeled on an existing, real-world enterprise network. The virtual network includes nine nodes, which are labelled a . . . j, along with a network emulator that simulates networked devices and provides forwarding/routing between virtual nodes. Web services and databases are deployed to the virtual nodes. Additionally, a network management and monitoring system is deployed, which queries routers, switches, and systems for status and other relevant information via simple network management protocol ("SNMP"). A user modeling tool is executed, which accesses Web services and generates network traffic. FIG. 10 illustrates the layout of the network, which includes two campus networks interconnected by a wide-area network. The following table lists significant relationships, in terms of aggregate flows of packets, between nodes in the network.

TABLE III

Significant Relationships Between Nodes in Second Example Scenario.

| source → destination | port |
|---|---|
| b → f | tcp: 8181 |
| a → e | tcp: 8181 |
| f → c | tcp: 8181 |
| g → a | tcp: 8181 |

TABLE III-continued

Significant Relationships Between Nodes in Second Example Scenario.

| source → destination | port |
|---|---|
| c → i | tcp: 24731 |
| e → h | tcp: 24732 |
| d → * | udp: 161 |

Network flow information is divided into subsets by destination and source network address. The operation is not a true partition, as each record generates two tag sets. For each subset, a function $f$ maps the network address, protocol, and transport ports to a set of tags that express logical location and protocol usage. Then, the source behavior (outgoing traffic) for each node is identified, using closed frequent item sets. The following table shows significant item sets generated for outgoing traffic using the FP Growth approach, illustrating source behavior characteristics for the respective nodes.

TABLE IV

Outgoing Traffic from Nodes in Second Example Scenario.

| Node | Port | Service Network | Support (threshold = 10%) |
|---|---|---|---|
| a | tcp: 8181 | 172.22.0.0/16 | 100 |
| b | tcp: 8181 | 172.12.0.0/16 | 100 |
| c | tcp: 24731 | 172.11.0.0/16 | 100 |
| d | udp: 161 | 172.11.0.0/16 | 33.4 |
|  | udp: 161 | 172.12.0.0/16 | 29.8 |
|  | udp: 161 | 172.21.0.0/16 | 25.4 |
|  | udp: 161 | 172.22.0.0/16 | 10.2 |
| e | tcp: 24732 | 172.12.0.0/16 | 100 |
| f | tcp: 8181 | 172.11.0.0/16 | 100 |
| g | tcp: 8181 | 172.22.0.0/16 | 100 |

In Table IV, the service network addresses are subject to subnet mask values. The decision to generalize service network address according to subnet mask values was made to reduce dissimilarity scores, which were deemed to be artificially high, as explained with reference to FIGS. 11a-11c.

Figure 11A:
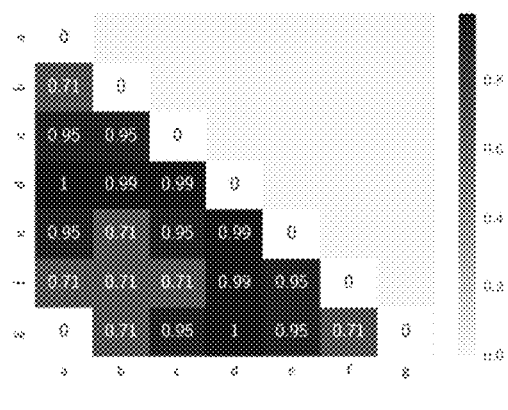
FIGS. 11a-11d are diagrams illustrating similarity between network assets in the second example scenario.

FIG. 11a shows a heatmap of pairwise differences (dissimilarity scores) between nodes for outgoing traffic, and thus characterizes similarity of their source behavior, if complete service network addresses are considered. In this case, no node is very similar with any other node, which is reflected in the high dissimilarity scores. Based on review of communication patterns in the network, the dissimilarity scores were deemed to be artificially high due to influence of the "Service Network" attribute.

Figure 11B:
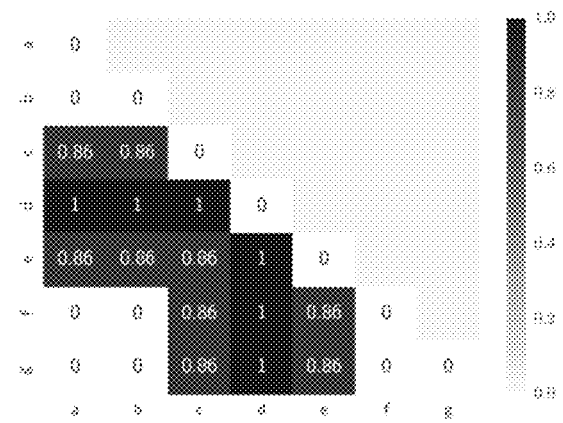

FIG. 11b shows another heatmap of pairwise differences (dissimilarity scores) between nodes for outgoing traffic, if port and protocol are used as a proxy for behavior (ignoring the Service Network attribute). This heatmap confirms that node d is distinct in its behavior (score of 1 compared to each other node), while another set of nodes (a, b, f, and g) has very similar behavior for outgoing communication (scores of 0 with respect to each other).

Figure 11C:
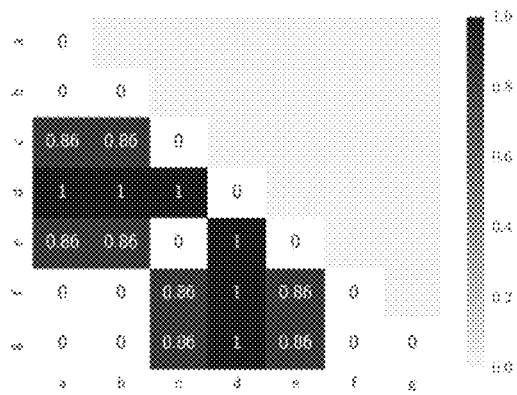

FIG. 11c shows another heatmap of pairwise differences (dissimilarity scores) between nodes for outgoing traffic, if port and protocol are used as a proxy for behavior (ignoring the Service Network attribute) and database-related TCP ports 24731 and 24732 are consolidated. According to this heatmap, node d is distinct in its behavior, nodes a, b, f, and g have very similar behavior for outgoing communication, and nodes c and e have similar behavior for outgoing communication (score of 0 with respect to each other). That is, nodes c and e are both different from the rest of the nodes in a similar fashion. FIGS. 11b and 11c illustrate the importance of finding the correct context for the function used when mapping flow records to nested sets of tags (e.g., picking the subset of attributes to use; using wildcards in appropriate attributes).

Figure 11D:
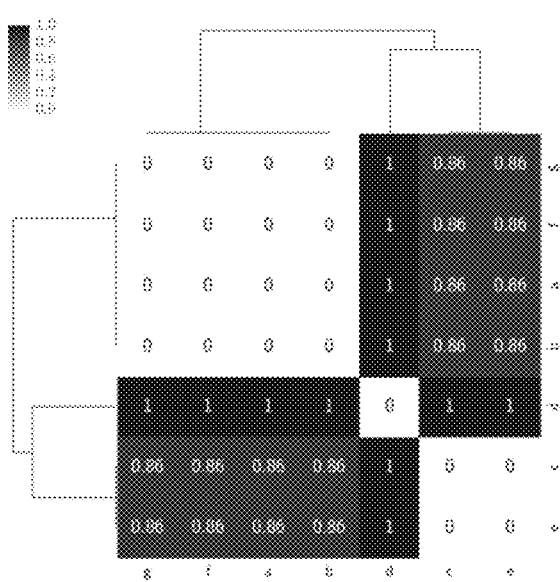

Finally, FIG. 11d shows a heatmap in which nodes are rearranged to emphasize clusters of similar nodes. In FIG. 11d, nodes a, b, f, and g are clustered to emphasize their similarity with each other, and nodes c and e are clustered to emphasize their similarity with each other.

IV. Identifying Multi-Hop Network Dependencies Using Deep Learning.

Although the behavior of computer networks is sometimes characterized as chaotic or unpredictable, once an element of a dependency structure between network assets is identified, other elements may be regular in terms of time and space. The regularity of the dependency structures between network assets can be observed as recurrent patterns in network flow information.

This section describes innovations in the area of network analysis, in which a network analysis tool receives network flow information and uses deep learning to identify dependencies between network assets. The deep learning models high-level abstractions in the network flow information. For example, the network analysis tool uses a self-organizing map ("SOM") or other type of neural network to identify clusters of similar interactions between network assets, then uses further analysis (e.g., multilevel clustering or decision support trees) to identify robust dependency structures. Depending on implementation, a network analysis tool incorporating one of the innovations described in this section can provide one or more of the following advantages.

- Based on identified dependencies, the network analysis tool can discover functional relationships between network assets, determining which network assets work together to provide some functionality in a computer network. This, in turn, can help decision-makers assess the "criticality" of network assets—the importance of the network assets to business processes that those network assets serve. It can also provide information useful for wide area fault localization and debugging, network operation and management, and proactive, resilient cyber-defense (e.g., with network address hopping and/or dynamic network reconfiguration).
- The network analysis tool can work by observing network activity (network traffic), without intervening in network activity or perturbing network activity. The network analysis tool can identify dependencies without imposing a performance penalty or logistic penalty.
- The network analysis tool can use network flow information that is readily available in most computer networks. For example, the network analysis tool uses information available from routers in a computer network, such as network flow information in a NetFlow or IPFIX format.
- The network analysis tool can use network flow information that summarizes network activity, without tracking or caching individual packets in a computer network. In addition to simplifying the analysis process, this can alleviate privacy concerns and security concerns.
- The network analysis tool can update its assessment of dependencies between network assets on a near-real-time basis, using network flow information from a recent time period to give a near-current perspective on the state of a computer network. By reacting to network changes, this can further improve the quality and speed of decision-making processes based on the identified dependencies.

In general, using one or more of the innovations described in this section, a network analysis tool can discover recurring temporal patterns in the network flow information. Repeated patterns of network activity in time and space suggest dependency relationships. Based on the repeated patterns, dependency relationships can be shown in a graphical model of a network. For example, the graphical model is a diagram in which vertices represent network assets and edges represent dependency relationships. The graphical model can further include annotations that show details about network assets (e.g., names of computer systems, network addresses, or protocol information shown as labels for the network assets) and/or show an assessment of criticality of the network assets, respectively.

A. Example Computer Network Dependencies.

In general, in a computer network, the pattern of a communication exchange involves a requester and a responder communicating across channels. A given service responds to queries or requests issued from some services (e.g., clients), but may also request performance of functions by other services. A given service A depends on another service B if the given service A is unable to complete its task without the other service B. This dependency between services A and B can be depicted A→B.

A dependency A→B is a local-remote dependency if the given service A depends on a remote service B to provide a service. For example, a Web service (as the given service A) may depend on a database (as the remote service B) to retrieve content. In this example, the remote service B is an upstream server of the given service A. On the other hand, a dependency A→B is a remote-remote dependency if a client (or other service) depends on a remote service B to access a given service A, which is also remote. For example, a Web service (as remote service A) depends on a DNS service (as remote service B) that a Web client uses to translate a hostname into a network address before the Web client can access the Web service. Local-remote dependencies are common in server-server configurations, while remote-remote dependencies are common in client-server configurations.

Figure 12:
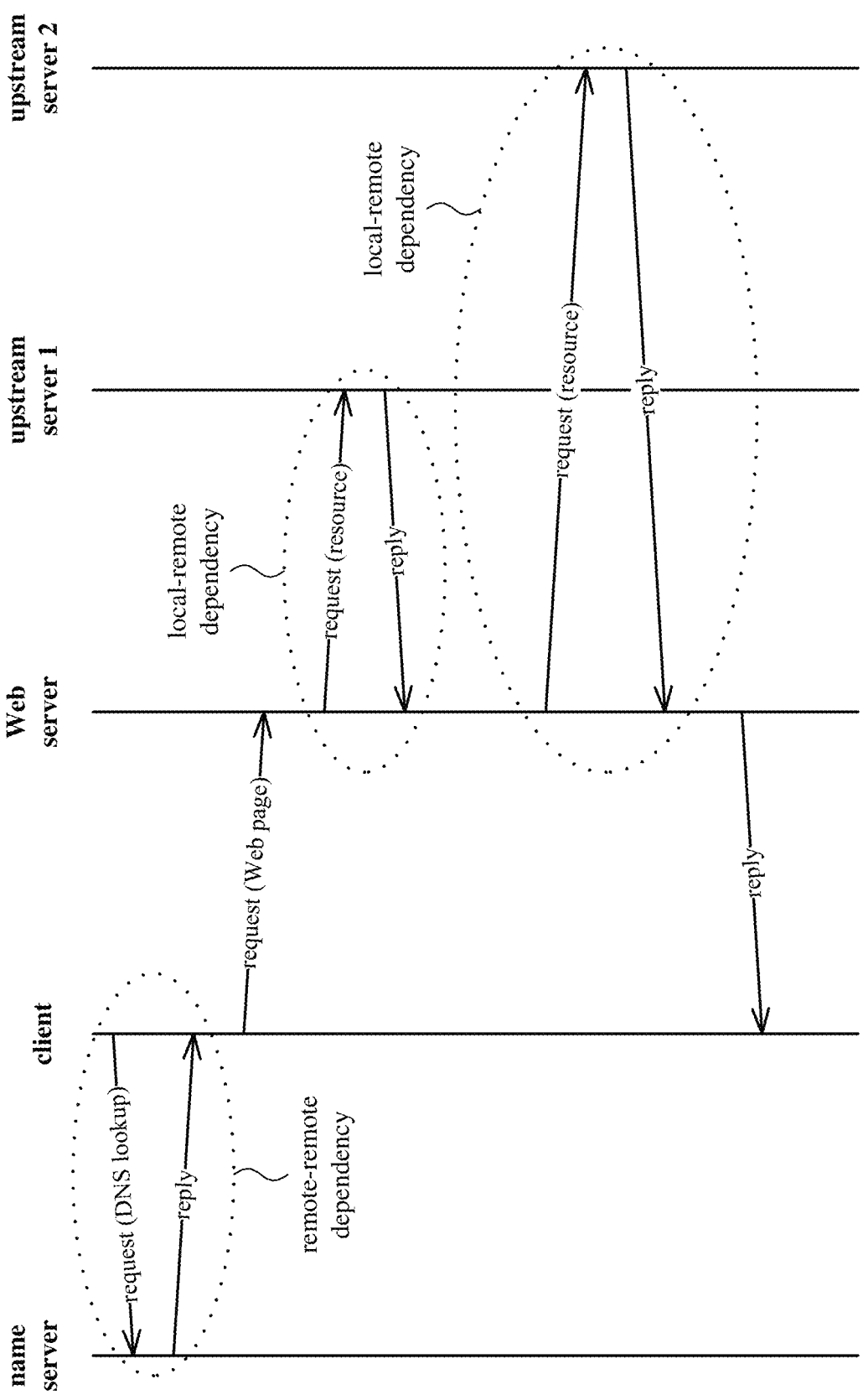
FIG. 12 is a diagram illustrating example dependencies during communication between a client and a service comprising multiple servers.

FIG. 12 is a timing diagram (1200) that illustrates example dependencies during communication between a client and a service comprising multiple servers. A Web server has a remote-remote dependency. For the remote-to-remote dependency, the client sends a request for a DNS lookup operation to the name server, which performs the DNS lookup operation to resolve the Web server's hostname to a network address, then returns a reply to the client. Using the information provided by the name server, the client requests a Web page from the Web server. The Web server also has two local-remote dependencies, since the Web server depends on each of two upstream servers in order to provide the requested Web page to the client. The Web server sends a request for a resource to each of the two upstream servers. After each of the upstream servers processes its request from the Web server and returns a reply, the Web server returns a reply to the client.

In real-world scenarios, dependencies in server-server configurations or client-server configurations may be revealed only sporadically. A Web service may cache database responses, obscuring a dependency between the Web service and database. A Web client may cache responses from a DNS service, obscuring dependencies between Web services and the DNS service.

In network flow information, sequences of events (network flows in time periods) can be merged spatially and temporally (within a given time period). In any given time period, there may be one or more active sequences of events, including the possibility of multiple instances of the same sequence. In a typical computer network, certain patterns of interaction recur between network assets in the computer network. Over time, such regular interactions between network assets can create recurrent temporal sequence-based patterns in the network flow information. A recurrent temporal sequence-based pattern is a randomly-initiated sequence of time-dependent elements (such as network flows in a time period) that recurs in time. The elements of a recurrent temporal sequence-based pattern exhibit time conservation, which means the elements exhibit some temporal stability.

B. Example Software Architecture for Identifying Dependencies Between Network Assets Using Deep Learning.

Figure 13:
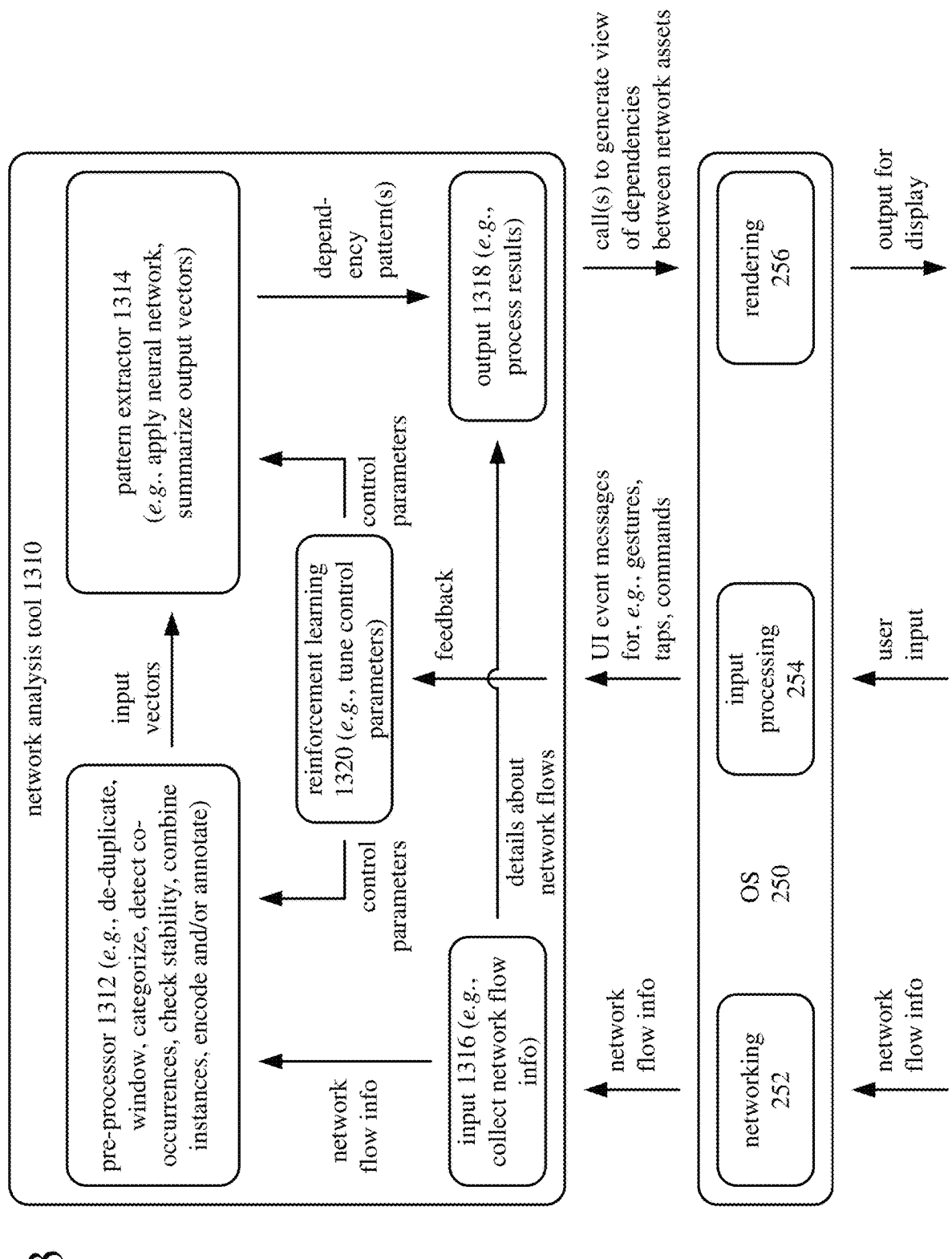
FIG. 13 is a block diagram illustrating an example software architecture in which a network analysis tool is configured to use deep learning to extract multi-hop network dependencies between network assets.

FIG. 13 shows an example software architecture (1300) for a network analysis tool (1310) that works with an OS (250) to identify dependencies between network assets using deep learning. A computing system (e.g., smartphone, tablet computer, personal computer, or other computing system) can execute software organized according to the architecture (1300).

The architecture (1300) includes an OS (250) and a network analysis tool (1310) that uses services of the OS (250). As described with reference to FIG. 2, the OS (250) includes components for rendering (e.g., rendering visual output to a display), components for networking, and components for input processing, as well as other components of the OS (250) that are not shown. In general, the OS (250) manages user input functions, output functions, storage access functions, network communication functions, and other functions for the computing system, as described with reference to FIG. 2. The OS (250) provides access to such functions to the network analysis tool (1310) and other software running on the computing system.

In a networking module (252), the OS (250) receives network flow information from one or more network probes of a computer network, as described with reference to FIG. 2. The networking module (252) can provide the network flow information to the input module (1316) of the network analysis tool (1310) by passing the messages. Or, the networking module (252) can extract the network flow information from the messages and provide the network flow information directly to the input module (1316) of the network analysis tool (1310).

In an input processing module (254), the OS (250) includes functionality for recognizing taps, finger gestures, or other input to a touchscreen, recognizing commands from voice input, mouse input, button input or key press input, and creating messages that can be used by the network analysis tool (1310). The network analysis tool (1310) listens for UI event messages from the OS (250), which indicate UI events. If appropriate, the network analysis tool (1310) can react to the user input (or another type of notification) by making one or more calls to the OS (250) or performing other processing. In particular, based on user input, a reinforcement learning module (1320) of the network analysis tool (1310) can tune control parameters for pre-processing and/or pattern extraction.

The network analysis tool (1310) includes a pre-processor (1312), a pattern extractor (1314), an input module (1316), an output module (1318), and a reinforcement learning module (1320). Overall, the network analysis tool (1310) receives network flow information, identifies dependencies between network assets of a computer network using a deep learning workflow, and outputs results of the identification of the dependencies.

The input module (1316) receives network flow information (e.g., as part of messages, as records of network flow information) from the networking module (252) of the OS (250). The input module (1316) collects the network flow information and provides it to the pre-processor (1312).

The pre-processor (1312) receives the network flow information from the input module (1316) and processes the network flow information to produce input vectors for the deep learning workflow. One or more control parameters can control stages of processing in the pre-processor (1312). For example, the pre-processor (1312) performs stages of processing to: (a) de-duplicate the network flow information (combining unidirectional flows into bidirectional flows, where appropriate); (b) window the network flow information; (c) categorize network flows; (d) detect co-occurrences of events in the network flow information; (e) check the stability of categorization; (f) combine instances of co-occurrences into higher-order combinations; (g) encode higher-order combinations into input vectors; and/or (h) annotate the input vectors. Additional details for stages of pre-processing in some examples are described with reference to FIG. 14. Alternatively, the pre-processor (1312) performs other and/or additional stages of pre-processing. The pre-processor (1312) provides the input vectors to the pattern extractor (1314).

The pattern extractor (1314) uses the deep learning workflow to extract patterns in the input vectors provided by the pre-processor (1312). The deep learning is a set of coordinated machine learning approaches that model high-level abstractions in the input vectors. One or more control parameters can control stages of processing in the pattern extractor (1314). For example, the pattern extractor (1314) applies a neural network to the input vectors, producing output vectors (weight vectors). The neural network can be a self-organizing map ("SOM") or other type of neural network. The pattern extractor (1314) can then summarize the output vectors, so as to identify recurrent patterns in the network flow information. Additional details for stages of pattern extraction in some examples are described with reference to FIG. 15. Alternatively, the pattern extractor (1314) performs other and/or additional stages of pattern extraction using a different deep learning workflow. The pattern extractor (1314) provides one or more dependency patterns to the output module (1318).

The output module (1318) receives the dependency pattern(s) from the pattern extractor (1314). The output module (1318) can also receive details about the network flows in the network flow information. Such details can be added to the input vectors (as labels or other annotations) by the pre-processor (1312). Or, such details can be passed directly by the input module (1316). In any case, the output module (1318) processes the dependency pattern(s) (and other details about the network flows) to make one or more calls to the OS (250) to generate a view of the dependencies between the network assets of the computer network.

In a rendering module (256), the OS (250) handles the call(s) from the output module (1318) of the network analysis tool (1310) to generate a view of the dependencies between the network assets of the computer network. For example, the rendering module (256) renders a graphical model of the computer network. For the graphical model, vertices in a diagram can represent network assets, and edges in the diagram can represent dependency relationships. The graphical model can also include annotations to show details about network assets (e.g., names of computer systems, network addresses, or protocol information shown as labels). The graphical model can emphasize the criticality of the network assets, respectively (e.g., with different colors for different levels of criticality). Alternatively, the dependencies between network assets of a computer network can be shown in some other form of graphical representation.

The reinforcement learning module (1320) sets control parameters for the pre-processor (1312) and/or the pattern extractor (1314), and can hence provide feedback within the network analysis tool (1310). The feedback can influence the pipeline of processing within the network analysis tool (1310), thereby improving accuracy of the network analysis. Initially, the control parameters can have default values or values from a prior session of network analysis. The reinforcement learning module (1320) can then tune the control parameters based on user input, e.g., reacting to a graphical model rendered by the rendering module (256). For example, through input to a graphical user interface, an analyst (user) can select network assets, combinations of network assets, or dependencies that should be ignored in subsequent analysis because such network assets, combinations, dependencies, etc. represent "false positives" in the output. Or, as another example, through input to a graphical user interface, the analyst (user) can select network assets, combinations of network assets, or dependencies that should get extra attention, weight or detail in subsequent analysis because such network assets, combinations, dependencies, etc. are of particular interest to the analyst, or are confirmed to be part of meaningful results. The reinforcement learning module (1320) can also tune control parameters based on feedback from within the network analysis tool (1310), e.g., based on thresholds defined so as to remove from consideration events that are insignificant or are outliers.

The control parameters used within the network analysis tool (1310) depend on implementation. For example, the control parameters can include: (1) a control parameter that controls co-occurrence detection during pre-processing; (2) a control parameter that controls how instances of temporally proximate co-occurrences are combined during pre-processing; (3) a control parameter (such as neural network stack depth) that controls how a neural network is applied during pattern extraction; and/or (4) a control parameter that controls summarization of output vectors during pattern extraction. Alternatively, the control parameters include other and/or additional control parameters.

Alternatively, the OS (250) includes more or fewer modules. Or, the network analysis tool (1310) includes more or fewer modules. A given module can be split into multiple modules, or different modules can be combined into a single module.

C. Example Stages of Pre-Processing for Deep Learning Workflow.

Figure 14:
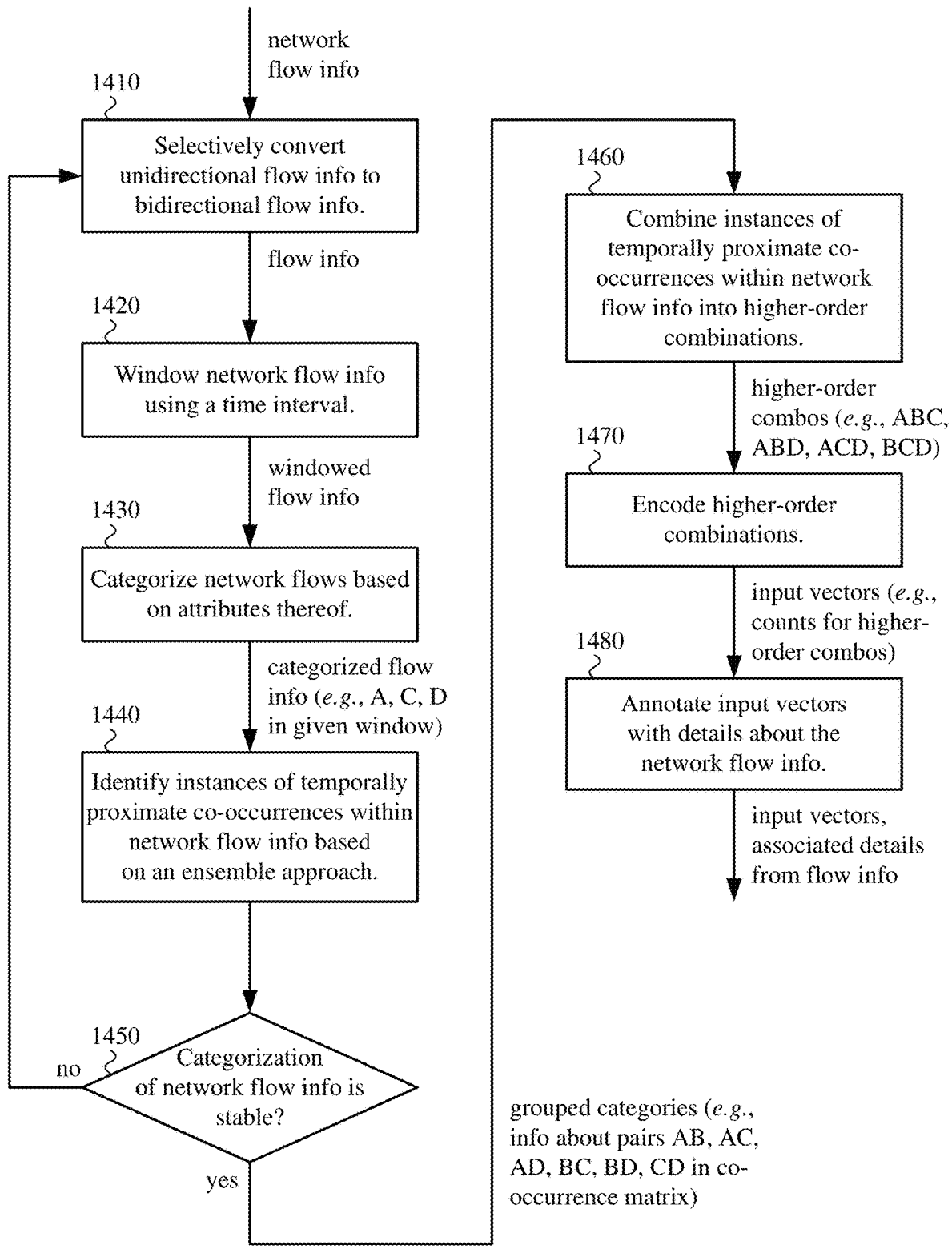
FIG. 14 is a block diagram illustrating example stages of pre-processing in the network analysis tool of FIG. 13, for a deep learning workflow.

FIG. 14 shows example stages (1400) of pre-processing by the pre-processor (1312) of FIG. 13. A network analysis tool can perform all of the example stages (1400) of pre-processing shown in FIG. 14. Or, the network analysis tool can perform a subset of the example stages (1400) of pre-processing shown in FIG. 14. Overall, the stages (1400) of pre-processing convert network flow information into a form suitable for machine learning by the pattern extractor (1314) (for the deep learning workflow).

With reference to FIG. 14, after collecting network flow information (as described above), the network analysis tool selectively converts (1410) unidirectional flow information to bidirectional flow information, combining flows where appropriate to do so. For example, the network analysis tool sorts records of network flow information by start time, identifies any pair of unidirectional flows (within some defined range of start times) in which start addresses and destination addresses are switched (flows in opposite directions), and aggregates packet data for that pair of unidirectional flows into a single bidirectional flow. Combining unidirectional flows into bidirectional flows can simplify later processing by significantly reducing the number of network flows considered.

Some unidirectional flows do not have a matching unidirectional flow in the opposite direction. Such a unidirectional flow can nevertheless be summarized as a bidirectional flow. Or, the network analysis tool can simply discard network flow information for a unidirectional flow that lacks a matching unidirectional flow in the opposite direction.

The network analysis tool then windows (1420) network flow information using a time interval. The network analysis tool segments network flows into windows having the time interval. The duration of the time interval depends on implementation. For example, the time interval is 5 seconds, 30 seconds, 120 seconds, 10 minutes, 30 minutes or some other duration of time. In some examples, the network analysis tool converts records of network flow information into a vector representation of n-tuples in a given time interval. For example, the n-tuple for a network flow (bi-flow) includes: (time$_{start}$, time$_{end}$, addr$_{src}$, addr$_{dst}$, ID$_{protocol}$, port$_{src}$, port$_{dst}$). The addresses can be IP addresses, and the ports can be TCP or UDP ports. Alternatively, the n-tuple includes other and/or additional attributes.

The network analysis tool then categorizes (1430) the windowed network flows based on attributes of the windowed network flows. For the categorizing (1430) stage, the network analysis tool assigns a record of network flow information to one of multiple possible categories based on the attributes of the record. The categories can be represented as letters (e.g., A, B, C, D, etc.) in an alphabet, which is the set of possible letters. For this reason, the categorizing (1430) stage can be termed "letterization," "letterizing," or, more generally, "binning." The output of the letterizing process is a sequence of labels for categorized records of network flow information (e.g., C, D, A, D, E, J) in a window.

In general, the letters (categories) represent events in the event space that is considered for pattern extraction using a deep learning workflow (e.g., event$_A$, event$_B$, event$_C$, event$_D$, etc. for letters A, B, C, D, etc.). The network analysis tool can use the letterizing process to reduce the number of possible discrete events (mapping j possible network flows to k possible bins), so as to make the subsequent machine learning more computationally tractable. Or, the network analysis tool can use the letterizing process to combine insignificant network flows, or to combine flows of a particular type or role of communication.

The network analysis tool can dynamically define the bins used to categorize records of network flow information, as well as the rules used to categorize records. For example, the network analysis tool generates/names the bins that characterize the event space for deep learning based on which source addresses, destination addresses, source ports (or other transport-level attributes for the source) and destination ports (or other transport-level attributes for the destination) are associated with network traffic. Using rules that categorize all network flows in the same way would be unproductive. At the other extreme, having rules that categorize all network flows in different categories may increase the computational complexity of subsequent machine learning processes to a prohibitive level. Alternatively, the network analysis tool can use pre-defined bins to categorize records of network flow information.

The letterizing process involves rule-based binning of records of network flow information. The network analysis tool places records in bins by applying one or more rules to the attributes of the records. The rules can be represented as a function $f(\text{attribute}_1, \text{attribute}_2, \ldots, \text{attribute}_n)$ that maps a record to a letter (category). For example, the function $f(\text{addr}_{src}, \text{addr}_{dst}, \text{ID}_{protocol}, \text{port}_{src}, \text{port}_{dst})$ maps a record of network flow information in a window to a category. Examples of rules used in the letterizing process include the following.

- Ignore part or all of source address (e.g., using a subnet mask to ignore part of source address). With this rule, the network analysis tool can group network flows from different sources (e.g., different Web clients) to the same destination (e.g., same service on a Web server). Using a subnet mask, the network analysis tool can group network flows from different sources within the same sub-network.
- Ignore source port (or other transport-level attribute for the source). With this rule, the network analysis tool can group network flows from a given source address, regardless of source port (or other transport-level attribute for the source).
- Ignore part or all of destination address (e.g., using a subnet mask to ignore part of destination address). With this rule, the network analysis tool can group network flows to different destinations from a given source.
- Ignore destination port (or other transport-level attribute for the destination). With this rule, the network analysis tool can group network flows to a given destination address, regardless of destination port (or other transport-level attribute for the source).
- Ignore, or account for, port numbers excluded from, or included in, a registry (e.g., IANA Service Name and Transport Protocol Port Number Registry).
- A combination of one or more of the preceding rules.

After the letterizing process, based on an ensemble approach, the network analysis tool identifies (1440) instances of temporally proximate co-occurrences of events within the network flow information. That is, the network analysis tool checks for temporal co-occurrences of letters within a temporal distance. A temporal co-occurrence of letters suggests the existence of a dependency relationship among the letters. The output of the co-occurrence detection is a set of letters (grouped categories) that co-occur within a certain temporal distance. For example, the temporal distance is the same duration as the time interval used during windowing (that is, the temporal distance is a single window). Alternatively, the temporal distance is another duration such as 1 second, 10 seconds, 30 seconds or another duration of time. Typically, the temporal distance for co-occurrence detection is shorter than the temporal distance for windowing—that is, co-occurrence detection generally happens within a given window.

The output of the co-occurrence detection can be information about pairs of co-occurring letters. In FIG. 14, the output of the co-occurrence detection is information about pairs AB, AC, AD, BC, BC, CD in a co-occurrence matrix. For example, the output is organized as a two-dimensional array of elements—a co-occurrence matrix—where the indices of the array are possible values of letters, and each element indicates whether a possible pair of letters is present (co-occurring) in the categorized records within the time interval. The following simplified co-occurrence matrix shows presence/absence for pairs of possible letters (A, B, C, D) in a time interval.

|  | $\text{event}_A$ | $\text{event}_B$ | $\text{event}_C$ | $\text{event}_D$ |
|---|---|---|---|---|
| $\text{event}_A$ | — | true | false | true |
| $\text{event}_B$ | true | — | false | false |
| $\text{event}_C$ | false | false | — | true |
| $\text{event}_D$ | true | false | true | — |

The pairs AB, AD, and CD are present within the time interval. Other pairs are not present. The matrix includes redundant values (above the diagonal or below the diagonal), which need not be counted. Alternatively, the co-occurrence matrix includes count values for the respective pairs of possible letters in a time interval, as shown in the following simplified example.

|  | $\text{event}_A$ | $\text{event}_B$ | $\text{event}_C$ | $\text{event}_D$ |
|---|---|---|---|---|
| $\text{event}_A$ | — | 3 | 0 | 1 |
| $\text{event}_B$ | 3 | — | 0 | 0 |
| $\text{event}_C$ | 0 | 0 | — | 1 |
| $\text{event}_D$ | 1 | 0 | 1 | — |

In this example, 3 instances of the pair AB, 1 instance of the pair AD, and 1 instance of the pair CD are present in the time interval. Other pairs are not present. Again, the matrix includes redundant values (above the diagonal or below the diagonal), which need not be counted.

Alternatively, the network analysis tool detects co-occurrence of some other number of letters (e.g., 3 co-occurring letters, 4 co-occurring letters) in a time interval.

The network analysis tool can simplify later analysis by removing singleton letters, which do not co-occur with any other letter. In this way, the network analysis tool restricts subsequent analysis to pairs of letters that co-occur, or combinations of such pairs, which reduces the event space and reduces computational complexity of machine learning stages. Removed singleton letters can also be flagged for elimination from consideration in later intervals. Alternatively, the output of the co-occurrence detection can include singleton letters.

The ensemble approach can be a weighted or un-weighted voting approach, an algebraic combiner approach or Bayesian modeling averaging approach. The ensemble approach can use, pool or combine any of several techniques for co-occurrence detection. For example, the ensemble approach can use a mutual information approach, a co-occurrence matrix followed by signal strength enhancement (such as normalization for statistical significance, e.g., z-score normalization), clustering (e.g., using a self-organizing map), an auto-correlation (cross-correlation) approach, cepstrum analysis (cepstral analysis), probability analysis (e.g., Bayesian statistics), information-theoretic entropy analysis (e.g., Shannon entropy, Renyi entropy), or another approach, or some combination of the preceding approaches in this paragraph.

The approaches to co-occurrence detection process signals in the network flow information. In the context of co-occurrence detection, a signal is a time series of a single letter. More formally, a signal is a set of triples {a, s, d}, where a is the letter from the alphabet and is an event, s is the time that the event is observed, and d is the duration of the event.

Cepstral Analysis.

The goal of cepstral analysis is to separate a signal into its source and noise components without prior knowledge of the system. The cepstrum of a signal is commonly defined as the inverse Fourier transform of the log-magnitude Fourier spectrum. The source and noise components of a signal become additive under the logarithmic operation, allowing for easy separation. The cepstral graph represents the quefrency (that is, the frequency of a frequency) of a signal. Noise tends to be a slowly varying component that appears in a lower quefrency region, while source components tend to appear as peaks in a higher quefrency region.

Cross-Correlation.

Cross-correlation is a measure of similarity between two time series (here, a time series is a run of a single letter) as a function of difference in time or lag applied to one of them.

Auto-Correlation.

Autocorrelation is the cross-correlation of a signal with itself. Auto-correlation represents the similarity between observations as a function of the time lag between them. Auto-correlation is useful for identifying repeating patterns in the presence of noise in a signal.

Information-Theoretic Entropy.

Information-theoretic entropy is a measurement, usually in terms of number of bits, of the amount of information content in a message or signal. It quantifies the "regularness" or "predictability" of the information. Joint and conditional entropy between two time series (here, a time series is a run of a single letter) is sensitive to and measures the amount of correlation (dependence) between the two time series. Examples of such entropy measures are defined by Shannon and Renyi.

Mutual Information:

Mutual information is a measurement of how much information one random variable (here, a letter for records of network flow information) reveals about another. A higher value of mutual information between two variables indicates a high measure of mutual dependence. A value of zero indicates that the two variables are independent of each other. Mutual information can also be expressed in terms of entropy between two variables. Pointwise mutual information ("PMI") is used as a measure of association between two variables. It measures the probability of their coincidence given their joint distribution against the individual distributions. Mutual information can be expressed as the expected value of PMI over all possible outcomes. As with mutual information, PMI is zero when two variables are independent and highest when the two variables are perfectly associated.

A control parameter that is set or tuned during reinforcement learning can affect the co-occurrence detection. For example, the control parameter limits which events can be classified as co-occurring, based on feedback about co-occurrences classified as "false positives" in prior analysis. Or, as another example, the control parameter promotes certain events as being classified as co-occurring, based on feedback to prior analysis. The control parameter can be implemented as one or more rules for classification.

After the co-occurrence detection, the network analysis tool checks (1450) whether categorization of network flow information is stable. For example, the network analysis tool checks whether the alphabet of letters stays within a threshold tolerance over a particular duration such as 10 minutes, 30 minutes, 2 hours, 8 hours, 1 day or some other duration of time. (The duration is dependent on goals of the observation. Shorter durations are sensitive to sequences with shorter durations. Longer durations are sensitive to sequences with longer durations.) If not, the network analysis tool returns to the selective conversion (1410) stage and attempts pre-processing with a new categorization scheme. Otherwise (categorization is stable), the network analysis tool continues to the next stages of pre-processing.

After the network analysis tool determines that the categorization is stable, the network analysis tool combines (1460) instances of temporally proximate co-occurrences within the network flow information into higher-order combinations. For example, the network analysis tool combines pairs of co-occurring letters into sets of three co-occurring letters (such as ABC, ABD, ACD and BCD) or sets of four co-occurring letters (such as ABCD). Creating higher-order combinations further simplifies processing during subsequent machine learning stages.

A control parameter that is set or tuned during reinforcement learning can affect how instances of temporally proximate co-occurrences are combined into higher-order combinations. For example, the control parameter limits which instances are combined, based on feedback about combinations classified as "false positives" in prior analysis. Or, as another example, the control parameter promotes certain instances as being classified as higher-order combinations, based on feedback to prior analysis. The control parameter can be implemented as one or more rules for classification.

The network analysis tool next encodes (1470) the higher-order combinations, producing input vectors in a form suitable for ingestion by the pattern extractor (1314). The network analysis tool can encode the higher-order combinations as binary values for the occurrence/non-occurrence of the respective combinations in a time interval such as 10 minutes, 30 minutes, 2 hours, 1 day or some other duration of time. In this case, an input vector includes a binary value per possible letter combination in the time interval. Or, as another example, the network analysis tool encodes the higher-order combinations as counts of occurrences in a time interval. In this case, an input vector includes a count value per possible letter combination in the time interval. Or, as another example, the network analysis tool encodes normalized counts of occurrences in a time interval. The network analysis can also encode time offsets for the occurrences (from a marker flow) in a time interval.

The network analysis tool annotates (1480) the input vectors with details about the network flow information. For example, the network analysis tool adds labels about network flows in hidden columns of the input vectors. This produces the input vectors with associated details from the network flow information.

The network analysis tool can omit one or more stages of the pre-processing. For example, the network analysis tool can skip the selective conversion to bidirectional flows. Or, the network analysis tool can skip the stability check for categorization. Or, the network analysis tool can skip the creation of higher-order combinations.

D. Example Stages of Pattern Extraction for Deep Learning Workflow.

Figure 15:
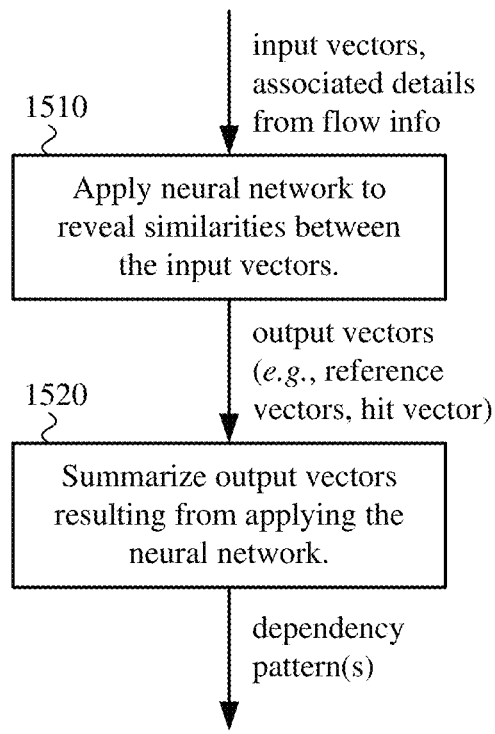
FIG. 15 is a block diagram illustrating example stages of pattern extraction in the network analysis tool of FIG. 13, for a deep learning workflow.

FIG. 15 shows example stages (1500) of pattern extraction by the pattern extractor (1314) of FIG. 13. A network analysis tool can perform all of the example stages (1500) of pattern extraction shown in FIG. 15. Or, the network analysis tool can perform a subset of the example stages (1500) of pattern extraction shown in FIG. 15. Overall, the stages (1500) of pattern extraction use a deep learning workflow to discover recurrent patterns in the input vectors from the pre-processing stage. The deep learning workflow (also called a deep structural learning workflow or hierarchical learning workflow) is a set of algorithms in machine learning that models high-level abstractions in the input vectors. The deep learning workflow typically uses non-linear transformations.

With reference to FIG. 15, the network analysis tool applies (1510) a neural network to reveal similarities between input vectors. For example, the network analysis tool applies a SOM, which is a two-dimensional unsupervised neural network that can be used to generalize, quantify and identify patterns in the input vectors. In general, a SOM associates output nodes of the SOM with groups or patterns in the input data set. The network analysis tool trains the SOM using the input vectors, which produces weight vectors for the nodes, respectively, of the SOM. The weight vectors indicate the similarities between the input vectors. Alternatively, the network analysis tool uses another type of neural network.

A control parameter that is set or tuned during reinforcement learning can affect how a neural network is applied. For example, the control parameter sets a neural network stack depth or other parameter for application of the neural network.

The neural network produces output vectors. For example, an SOM produces output reference vectors (with weights for nodes of the SOM) as well as an output hit vector (with information about the response of the SOM to the input vectors, e.g., how many times the respective nodes of the SOM were utilized during the training process, or a summary of influence of the respective nodes during the training process). The SOM can also produce other output information (such as an output distance vector indicating pairwise distances between the input vectors, or distances between output weight vectors from the SOM).

The network analysis tool then summarizes (1520) the output vectors that result from applying the neural network, producing one or more dependency patterns. For example, the network analysis tool performs hierarchical clustering on the output vectors. In general, the hierarchical clustering successively groups output vectors that are "close" according to some metric (such as Euclidean distance, squared Euclidean distance, Manhattan distance or maximum distance) and linkage criteria, gradually collapsing the initial output vectors into fewer output vectors, until an exit condition is reached (e.g., relating to the number of collapses or distance between remaining (collapsed) output vectors). When an SOM supplies output reference vectors and an output hit vector to the hierarchical clustering, the network analysis tool can perform z-score normalization on the output reference vectors.

The SOM and hierarchical clustering can operate over a longer time period than the windowing stage and other stages of the pre-processing. For example, the time period is 1 hour, 2 hours, 12 hours, 24 hours, 36 hours, 48 hours, or some other duration of time. By summarizing the output vectors over time, the network analysis tool can make the process of detecting patterns in the input vectors more robust.

Alternatively, instead of using an SOM and hierarchical clustering to extract the dependency patterns from the input vectors, the network analysis tool can use another machine learning approach (e.g., a decision support tree, which is a tree-like graph of decisions and consequences, for summarization; or one or more of the modules used for co-occurrence detection as described with reference to stage (1440) of FIG. 14; or a layered combination of any of the preceding machine learning approaches, including SOM and hierarchical clustering). In any case, the network analysis tool discovers signatures for patterns in the input vectors.

A control parameter that is set or tuned during reinforcement learning can affect how output vectors are summarized. For example, the control parameter limits which output vectors can be clustered, based on feedback about clustering classified as yielding "false positives" in prior analysis. Or, as another example, the control parameter promotes certain output vectors being clustered, based on feedback to prior analysis. The control parameter can be implemented as one or more rules for clustering.

V. Identifying Multi-Hop Network Dependencies Using Cross-Correlation and Peak Detection.

This section describes other innovations in the area of network analysis, in which a network analysis tool receives network flow information, merges flows into flow aggregates, and uses cross-correlation analysis and peak detection to identify dependencies between network assets. Depending on implementation, a network analysis tool incorporating one of the innovations described in this section can provide one or more of the following advantages.

Based on identified dependencies, the network analysis tool can discover functional relationships between network assets, determining which network assets work together to provide some functionality in a computer network. This, in turn, can help decision-makers assess the "criticality" of network assets—the importance of the network assets to business processes that those network assets serve. It can also provide information useful for wide area fault localization and debugging, network operation and management, and proactive, resilient cyber-defense (e.g., with network address hopping and/or dynamic network reconfiguration).

The network analysis tool can work by observing network activity (network traffic), without intervening in network activity or perturbing network activity. The network analysis tool can identify dependencies without imposing a performance penalty or logistic penalty.

The network analysis tool can use network flow information that is readily available in most computer networks. For example, the network analysis tool uses information available from routers in a computer network, such as network flow information in a NetFlow or IPFIX format.

The network analysis tool can use network flow information that summarizes network activity, without tracking or caching individual packets in a computer network. In addition to simplifying the analysis process, this can alleviate privacy concerns and security concerns.

The network analysis tool can update its assessment of dependencies between network assets on a near-real-time basis, using network flow information from a recent time period to give a near-current perspective on the state of a computer network. By reacting to network changes, this can further improve the quality and speed of decision-making processes based on the identified dependencies.

In general, using one or more of the innovations described in this section, a network analysis tool can discover recurring temporal patterns in the network flow information. Repeated patterns of network activity in time and space suggest dependency relationships. Based on the repeated patterns, dependency relationships can be shown in a graphical model of a network. For example, the graphical model is a diagram in which vertices represent network assets and edges represent dependency relationships. The graphical model can further include annotations that show details about network assets (e.g., names of computer systems, network addresses, or protocol information shown as labels for the network assets) and/or show an assessment of criticality of the network assets, respectively.

A. Example Software Architecture for Identifying Dependencies Between Network Assets Using Cross-Correlation Analysis and Peak Detection.

In an example software architecture, a network analysis tool works with an OS to identify dependencies between network assets using cross-correlation analysis and peak detection. A computing system (e.g., smartphone, tablet computer, personal computer, or other computing system) can execute software organized according to the architecture.

The network analysis tool includes a pre-processor that receives network flow information and processes the network flow information to produce flow aggregates. The pre-processor can perform stages of processing as described below. The network analysis tool also includes a pattern extractor, which performs cross-correlation operations and peak detection operations as described below, as well as summarization operations as described below. A reinforcement learning module in the network analysis tool sets control parameters for the pre-processor and/or the pattern extractor, and can hence provide feedback within the network analysis tool. Examples of control parameters are described below. Otherwise, the network analysis tool and OS include components as described with reference to the example software architecture (1300) of FIG. 13.

B. Example Stages of Pre-Processing for Cross-Correlation Analysis.

The network analysis tool can perform operations in various stages as part of pre-processing of network flow information to produce time series of information for flow aggregates. Overall, the pre-processing converts network flow information into a form suitable for cross-correlation analysis.

After collecting network flow information, the network analysis tool merges network flows into flow aggregates. Flows in a given flow aggregate share common attributes, such as destination network address, protocol, and destination transport port. In this way, dependency dynamics can be tracked over a population of clients that use a network service associated with the same destination address/port/protocol triple. Alternatively, flows in a flow aggregate can share a common source network address, protocol, and source transport port, if the entity of interest is a given source as it communicates with multiple other entities.

Assigning flows to flow aggregates based on an address/port/protocol triple works in most scenarios. In some cases, however, communications to a given service may use multiple ports concurrently. To associate client communications with the given service, the rule for mapping flows to flow aggregates can be modified to consider network address and protocol attributes of a destination (but not port) when merging flows into flow aggregates. In general, a rule can be represented as a function $f(\text{attribute}_1, \text{attribute}_2, \ldots, \text{attribute}_n)$ that maps a flow to a flow aggregate. For example, the function $f(\text{addr}_{dst}, \text{ID}_{protocol}, \text{port}_{dst})$ maps a flow to a flow aggregate based on address/port/protocol triple. Other examples of rules include the following.

Ignore part or all of destination address (e.g., using a subnet mask to ignore part of destination address). With this rule, the network analysis tool can group network flows to different destinations from one or more sources.

Ignore destination port (or other transport-level attribute for the destination). With this rule, the network analysis tool can group network flows to a given destination address, regardless of destination port (or other transport-level attribute for the source) at that destination address.

Ignore, or account for, port numbers excluded from, or included in, a registry (e.g., IANA Service Name and Transport Protocol Port Number Registry).

A combination of one or more of the preceding rules.

If communications from one or more destinations to a given source are tracked, similar rules can be defined to focus on source attributes (e.g., ignore part or all of source address; ignore source port). In practice, assigning a given flow to multiple aggregates may improve the reliability of results. One or more control parameters that are set or tuned during reinforcement learning can define rules used to merge flows into flow aggregates.

In some example implementations, each flow in a flow aggregate is timestamped with start and end times for that flow. For example, the timestamps for a flow are rounded to the nearest 10 milliseconds. Alternatively, the precision of timestamps for a flow is 12.5, 20, 100 or some other number of milliseconds. In general, the precision of timestamps is selected to be greater than the variance (jitter) of connection setup and to reduce clock skew.

The network analysis tool windows network flow information using a time interval. Specifically, the network analysis tool segments network flows into windows having the time interval, whose duration depends on implementation. In some example implementations, flow aggregates are windowed into 120 second sets. Alternatively, the time interval is 5 seconds, 30 seconds, 10 minutes, 30 minutes or some other duration of time.

The network analysis tool encodes the flow aggregates as time series of information, producing time series in a form suitable for input to cross-correlation analysis. For example, for a given flow aggregate A, the time series $T_A$ encodes at $T_A[j]$ the number (count value) of flows in the flow aggregate A that have a start timestamp of t+j. Count values are determined for each $j \geq 0$, where j is a tick of the decimated clock (e.g., every 10 milliseconds in some example implementations) after the start time t for a window. Alternatively, the network analysis tool can encode binary values for the presence/absence of any flows at the respective clock ticks. In this case, the time series $T_A$ includes a binary value per clock tick.

The network analysis tool can annotate flow aggregates with details about corresponding network flow information. This produces the flow aggregates with associated details from the network flow information.

The network analysis tool can omit one or more stages of the pre-processing. Alternatively, a network analysis tool performs operations in other and/or additional stages of pre-processing.

C. Example Stages of Cross-Correlation Analysis and Peak Detection.

The network analysis tool can perform operations in various stages as part of cross-correlation analysis. Overall, the network analysis tool calculates cross-correlation coefficients between time series (which encode information for flow aggregates) and determines multi-hop network dependencies based on the cross-correlation coefficients.

Specifically, pairs of time series for different flow aggregates are examined for "relatedness," which is measured through cross-correlation analysis as the extent to which one time series (for one flow aggregate) is a function of a relative offset of another time series (for another flow aggregate). The network analysis tool determines the cross-correlation $C_{A,A'}$ between two time-series $T_A$ and $T_{A'}$ with start time t, for A≠A'. The cross-correlation $C_{A,A'}$ of $T_A$ and $T_{A'}$ at lags k=0, ±1, ±2, . . . is:

$$C_{A,A'}[k] = \frac{Cov_{A,A'}[k]}{\sqrt{Cov_{A,A}[0]} \cdot \sqrt{Cov_{A',A'}[0]}}.$$

The function $Cov_{A,A'}[k]$ is defined as:

$$Cov_{A,A'}[k] = \begin{cases} \frac{1}{N}\sum_{n=1}^{N-k}(T_A[n]-\mu T_A)\cdot(T_{A'}[n+k]-\mu T_{A'}); & k=0,1,2,\ldots, \\ \frac{1}{N}\sum_{n=1}^{N+k}(T_{A'}[n]-\mu T_{A'})\cdot(T_A[n-k]-\mu T_A); & k=-1,-2,\ldots, \end{cases}$$

where N is the number of observations (that is, length) in $T_A$ and $T_{A'}$, and $\mu T_A$ and $\mu T_{A'}$ indicate the sample mean values.

The network analysis tool can use convolution operations to perform cross-correlation analysis. This can reduce computation time (increasing scalability) and improve precision (reducing floating point numerical error). In particular, the network analysis tool can use fast Fourier transformation (FFT) operations and inverse FFT (IFFT) operations, as follows.

$$T_{A,A'}[k] = \sum_{n=0}^{N-1}\left[\frac{1}{N}\sum_{u=0}^{N-1}FFT(T_A)_u\exp(2\pi iun/N)\right] \cdot$$
$$\frac{1}{N}\sum_{w=0}^{N-1}FFT(T_{A'})_w\exp(2\pi iw(n+k)/N)$$
$$= \sum_{n=0}^{N-1}\left[\frac{1}{N}\sum_{u=0}^{N-1}FFT(T_A)_u^*\exp(-2\pi iun/N)\right]^* \cdot$$
$$\left[\frac{1}{N}\sum_{w=0}^{N-1}FFT(T_{A'})_w\exp(2\pi iw(n+k)/N)\right]$$
$$= \frac{1}{N}\sum_{u=0}^{N-1}\sum_{w=0}^{N-1}FFT(T_A)_u^*FFT(T_{A'})_w\exp(2\pi iwk/N) \cdot$$
$$\left[\frac{1}{N}\sum_{n=0}^{N-1}\exp(-2\pi inu/N)\exp(2\pi inw/N)\right]$$

In the above, z* indicates the complex conjugate of z, which is a complex number. If u=w, the final term of the preceding equation can be ignored (resolves to 1), resulting in the simpler form:

$$= \frac{1}{N}\sum_{u=0}^{N-1}FFT(T_A)_u^*FFT(T_{A'})_u\exp(2\pi iuk/N)$$
$$= IFFT(FFT(T_A)^*FFT(T_{A'}))$$

Using FFT operations to compute cross-correlation values may lead to noise as a consequence of time series being discontinuous. To reduce noise and smooth cross-correlation values, the network analysis tool can apply smoothing factors. For example, the network analysis tool applies Lanczos smoothing factors σ[i] to the cross-correlation product in the frequency domain. The Lanczos smoothing factors σ[i] are defined for i=0, 1, 2, . . . , N:

$$\sigma[i] = \begin{cases} 1; & i=0, \\ \frac{\sin(2\pi i/N)}{2\pi i/N}; & i=1,2,\ldots,N-1 \end{cases}.$$

Applying the Lanczos smoothing factors σ[i] can help remove artificial correlation phenomena resulting from strong input discontinuities. Alternatively, the network analysis tool applies a different type of smoothing factors. Correlation detection can also be improved by assessing the noise floor in the correlation product.

To determine multi-hop network dependencies, the network analysis tool can determine whether a peak exists in the cross-correlation coefficients. That is, after correlation coefficients for all lags have been calculated, the network analysis tool can detect peaks in one of several ways. In one approach, the network analysis determines a maximum value of the correlation coefficients and checks whether the maximum value is above a peak threshold. If so (maximum value satisfies the peak threshold), a peak is considered to exist. Otherwise, a peak is not considered to exist. The peak threshold depends on implementation (e.g., 0.25 or another value) and can be specified as a control parameter. In another approach, the network analysis tool applies a continuous wavelet transform across different scales in order to find characteristics (e.g., shape) of a peak within the correlation coefficients. In yet another approach, the network analysis tool can use statistical techniques (such as calculating confidence intervals or inter-quartile range) to detect significant coefficients. Or, the network analysis tool can use brownboxing, which involves deleting observations in descending order until a metric (such as the mean) stabilizes. The removed observations are classified as outliers and can be considered potential peaks.

FIG. 16 is a pseudocode listing (1600) that illustrates windowed correlation operations in some example implementations. The pseudocode listing (1600) shows operations to create time series $T_A$ and $T_{A'}$ of samples for flows in a pair of flow aggregates. (Although only one pair of time series is shown, time series are potentially created and analyzed on a pairwise basis for an arbitrary number of flow aggregates.) For the pair of time series $T_A$ and $T_{A'}$, the pseudocode listing (1600) shows operations to pad the time series to set up FFT operations, compute forward FFTs for the respective time series, compute correlation values in the frequency domain, smooth the correlation values with Lanczos smoothing factors σ, compute covariance values with IFFT operations, compute the cross-correlation $C_{A,A'}$, and perform peak detection (shown as the PeakDetect function).

The robustness of the results of peak detection can be further improved by performing post-summary analysis over windowed results. Operations can be performed on overlapping windows of network flow information. Aggregation and windowed cross-correlation operations can be performed for each of the overlapping windows, and information about resulting candidate network dependencies can be stored in a database. In particular, information about any correlation relationships that satisfy the peak threshold in a window can be added to the database. The network analysis tool can perform consensus-based merging of results, producing a summary report for a time period such as an hour, day, week, etc. that focuses on the consensus of network dependency results. The network analysis tool can assign a consensus confidence score to each network dependency noted in the summary report, based on the average of all confidence scores for that network dependency within the database. To further improve results, the network analysis tool can apply a threshold to filter out low-frequency network dependencies and/or apply a threshold to filter based on consensus confidence score.

VI. Alternatives and Variations.

In some of the preceding examples, the first workflow (for identifying one-hop network behavior) precedes the second workflow (for identifying multi-hop network dependencies) as part a larger process with multiple workflows. Alternatively, the first workflow can follow the second workflow as part a larger process with multiple workflows. Or, the first workflow and second workflow can be performed concurrently or, for systems with multiple processors, in parallel. Or, a network analysis tool can perform only the first workflow or only the second workflow.

In some of the preceding examples, network flow information is input to the first workflow (for identifying one-hop network behavior), and the network flow information is also input to the second workflow (for identifying multi-hop network dependencies). Alternatively, intermediate values (e.g., from a pre-processor) and/or final output values from the first workflow can be input to the second workflow as part of a combined workflow. Or, intermediate values (e.g., from a pre-processor) and/or final output values from the second workflow can be input to the first workflow as part of a combined workflow.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method comprising:
    receiving network flow information;
    in a first workflow, identifying one-hop network behavior of at least some of a set of network assets based on a first evaluation of the network flow information, wherein each network asset of the set of network assets is a network node or service, and wherein, for a given network asset among the set of network assets, the one-hop network behavior indicates patterns of communication to and/or from the given network asset individually;
    in a second workflow, identifying multi-hop network dependencies between at least some of the set of network assets based on a second evaluation of the network flow information, wherein the multi-hop network dependencies indicate patterns of communication between combinations of network assets among the set of network assets; and
    outputting results of the identifying the one-hop network behavior and/or results of the identifying the multi-hop network dependencies.

2. The method of claim 1, wherein the one-hop network behavior for the given network asset summarizes outgoing communications from the given network asset and/or incoming communications to the given network asset.

3. The method of claim 1, further comprising, as part of the first workflow:

pre-processing the network flow information to produce records of network flow information;
for each of the records, mapping the record to a nested set of tags;
using association rule learning to extract frequent item sets from the nested sets of tags for the records, wherein the association rule learning is machine learning that identifies frequently-occurring sets of tags;
determining the one-hop network behavior based on the frequent item sets.

4. The method of claim 3, wherein the pre-processing includes one or more of:
    selectively converting unidirectional flow information, in the network flow information, to bidirectional flow information;
    windowing the network flow information using a time interval; and/or
    annotating the records with details about the network flow information.

5. The method of claim 3, wherein, for a given record of the records, the mapping includes applying a function to attributes of the given record to determine the nested set of tags for the given record.

6. The method of claim 5, wherein the attributes include source address, source port, destination address, destination port and protocol, wherein the source address is a network source address or logical source address, and wherein the destination address is a network destination address or logical destination address.

7. The method of claim 5, wherein, for a given attribute of the attributes, the function ignores the given attribute or applies a wildcard to permit any value for the given attribute.

8. The method of claim 5, wherein, for a given attribute of the attributes, the function produces a hierarchy of tags that characterize the given attribute.

9. The method of claim 3, wherein the using association rule learning includes, for a given item set in the nested sets of tags for the records:
    determining support of the given item set; and
    comparing the support of the given item set to a threshold.

10. The method of claim 9, wherein the threshold is a user-specified threshold.

11. The method of claim 3, wherein the determining the one-hop network behavior includes identifying, among the set of network assets, subsets of network assets having similar network behavior based on a measure of similarity or dissimilarity between pairs of the frequent item sets.

12. The method of claim 11, wherein the measure of similarity or dissimilarity:
    employs a scaling parameter to adjust significance of support values;
    quantifies deviation between the frequent item sets; or
    allows partial matching of item sets.

13. The method of claim 1, further comprising, as part of the second workflow:
    pre-processing the network flow information to produce input vectors;
    using deep learning to extract patterns in the input vectors, wherein the deep learning is machine learning that models high-level abstractions in the input vectors; and
    determining the multi-hop network dependencies based on the patterns.

14. The method of claim 1, further comprising, as part of the second workflow:
    pre-processing the network flow information to produce time series of information for flow aggregates;

calculating cross-correlation coefficients between the time series; and determining the multi-hop network dependencies based on the cross-correlation coefficients.

15. The method of claim 14, wherein the calculating correlation coefficients uses convolution operations, wherein the second workflow further includes smoothing the cross-correlation coefficients, and wherein the determining the multi-hop network dependencies includes determining whether a peak exists in the cross-correlation coefficients.

16. The method of claim 1, wherein the outputting results of the identifying the one-hop network behavior includes rendering a heat map of dissimilarity scores.

17. The method of claim 1, wherein the network flow information includes an n-tuple per network flow, the network flow being an aggregation of packets that have common protocol attributes, and wherein the network flow information is received from multiple network probes situated in a network.

18. The method of claim 1, further comprising:
repeating the receiving network flow information, the identifying the one-hop network behavior, the identifying the multi-hop network dependencies, and the outputting, so as to update an assessment of the one-hop network behavior and the multi-hop network dependencies on a near real-time basis.

19. One or more non-transitory computer-readable media storing computer-executable instructions for causing a computer system, when programmed thereby, to perform operations comprising:
receiving network flow information;
in a first workflow, identifying one-hop network behavior of at least some of a set of network assets based on a first evaluation of the network flow information, wherein each network asset of the set of network assets is a network node or service, and wherein, for a given network asset among the set of network assets, the one-hop network behavior indicates patterns of communication to and/or from the given network asset individually;
in a second workflow, identifying multi-hop network dependencies between at least some of the set of network assets based on a second evaluation of the network flow information wherein the multi-hop network dependencies indicate patterns of communication between combinations of network assets among the set of network assets; and
outputting results of the identifying the one-hop network behavior and/or results of the identifying the multi-hop network dependencies.

20. The one or more non-transitory computer-readable media of claim 19, wherein the operations further comprise, as part of the first workflow:
pre-processing the network flow information to produce records of network flow information;
for each of the records, mapping the record to a nested set of tags;
using association rule learning to extract frequent item sets from the nested sets of tags for the records, wherein the association rule learning is machine learning that identifies frequently-occurring sets of tags;
determining the one-hop network behavior based on the frequent item sets.

21. The one or more non-transitory computer-readable media of claim 19, wherein the operations further comprise, as part of the second workflow:

pre-processing the network flow information to produce input vectors;
using deep learning to extract patterns in the input vectors, wherein the deep learning is machine learning that models high-level abstractions in the input vectors; and
determining the multi-hop network dependencies based on the patterns.

22. The one or more non-transitory computer-readable media of claim 19, wherein the operations further comprise, as part of the second workflow:
pre-processing the network flow information to produce time series of information for flow aggregates;
calculating cross-correlation coefficients between the time series; and
determining the multi-hop network dependencies based on the cross-correlation coefficients.

23. The one or more non-transitory computer-readable media of claim 19, wherein the outputting results of the identifying the one-hop network behavior includes rendering a heat map of dissimilarity scores.

24. The one or more non-transitory computer-readable media of claim 19, wherein the operations further comprise:
repeating the receiving network flow information, the identifying the one-hop network behavior, the identifying the multi-hop network dependencies, and the outputting, so as to update an assessment of the one-hop network behavior and the multi-hop network dependencies on a near real-time basis.

25. A computer system comprising a processing unit and memory, wherein the computer system implements a network analysis tool comprising:
an input module configured to receive network flow information;
a pre-processor configured to pre-process the network flow information, producing records of network flow information; and
a pattern extractor configured to:
for each of the records, map the record to a nested set of tags;
use association rule learning to extract frequent item sets from the nested sets of tags for the records, wherein the association rule learning is machine learning that identifies frequently-occurring sets of tags; and
determine one-hop network behavior of at least some of a set of network assets based on the frequent item sets, wherein each network asset of the set of network assets is a network node or service, and wherein, for a given network asset among the set of network assets, the one-hop network behavior indicates patterns of communication to and/or from the given network asset individually.

26. The computer system of claim 25, wherein the pre-processor is configured to pre-process the network flow information by performing operations that include:
selectively converting unidirectional flow information, in the network flow information, to bidirectional flow information;
windowing the network flow information using a time interval; and/or
annotating the records with details about the network flow information.

27. The computer system of claim 25, wherein, to map the record to the nested set of tags, the pattern extractor is configured to apply a function to attributes of the record to determine the nested set of tags for the record.

28. The computer system of claim 25, wherein, to use the association rule learning, the pattern extractor is configured to perform operations that include, for a given item set in the nested sets of tags for the records:
- determining support of the given item set; and
- comparing the support of the given item set to a threshold.

29. The computer system of claim 25, wherein, to determine the one-hop network behavior, the pattern extractor is configured to perform operations that include, identifying, among the set of network assets, subsets of network assets having similar network behavior based on a measure of similarity or dissimilarity between pairs of the frequent item sets.

30. The computer system of claim 25, wherein the network flow information includes an n-tuple per network flow, the network flow being an aggregation of packets that have common protocol attributes, and wherein the in the network flow information is received from multiple network probes situated in a network.

* * * * *